(12) United States Patent
Eder

(10) Patent No.: US 6,321,205 B1
(45) Date of Patent: Nov. 20, 2001

(54) METHOD OF AND SYSTEM FOR MODELING AND ANALYZING BUSINESS IMPROVEMENT PROGRAMS

(75) Inventor: Jeff Eder, Redmond, WA (US)

(73) Assignee: Value Miner, Inc., Redmond, WA (US)

( * ) Notice: Subject to any disclaimer, the term of this patent is extended or adjusted under 35 U.S.C. 154(b) by 0 days.

(21) Appl. No.: 09/135,983

(22) Filed: Aug. 17, 1998

Related U.S. Application Data

(63) Continuation-in-part of application No. 08/779,109, filed on Jan. 6, 1997, which is a continuation-in-part of application No. 08/999,245, filed on Dec. 10, 1997, which is a continuation-in-part of application No. 08/539,020, filed on Oct. 3, 1995, now abandoned.

(51) Int. Cl.$^7$ ................................................ G06F 17/60
(52) U.S. Cl. ................................................ 705/7; 705/40
(58) Field of Search ........................... 705/1, 7, 36, 10; 395/670, 500

(56) References Cited

U.S. PATENT DOCUMENTS

| | | | |
|---|---|---|---|
| 5,737,581 | * | 4/1998 | Keane ................................... 395/500 |
| 5,809,282 | * | 9/1998 | Cooper et al. ........................ 709/226 |
| 5,812,988 | * | 9/1998 | Sandretto .............................. 705/36 |
| 5,875,431 | * | 2/1999 | Heckman et al. ...................... 705/7 |

FOREIGN PATENT DOCUMENTS

WO 98/38588 * 9/1998 (WO) .............................. G06F/17/60

OTHER PUBLICATIONS

Valuation of Intellectual Property and Intangible Assets, Gordon V. Smith, Russel L. Parr, 1994.*

Reilly, Robert, "Valuation of intangible assets for bankruptcy and reorganization of purposes" Ohio CPA Journal, v53n4 pp. 25–30, Aug. 1994.*

Maxson, Mark, "will you get your money's worth?" Financial Executive, v9n3 pp. 54–58, Jun. 1993.*

Baumann, Barbara; Oxaal, Marjorie; "estimating the value of group medical practice: A primer; Healethcare Financial Managment"; v47n12 pp. 58–62+, Dec. 1993.*

Friedman, Richard; Business valuation: Calculating it right; Practical Accountant; v27n10 pp. 34–41, Oct. 1994.*

Liebich, Kim; "How to value a bank"; ABA Banking Journal; v87n8 pp: 21–25, Aug. 1994.*

* cited by examiner

*Primary Examiner*—James P. Trammell
*Assistant Examiner*—Yehdega Retta

(57) ABSTRACT

An automated system (100) and method for evaluating the probable impact of user-specified or system generated changes in business value drivers on the other value drivers, the financial performance and the future value of a commercial enterprise. Value drivers are identified using search algorithms and induction algorithms that define the value drivers associated with each element of the enterprise. After identifying enterprise value drivers the system completes a detailed valuation of the firm using predictive models to determine the relative impact of each value driver on the overall valuation. The detailed valuation results are then used to define a financial simulation model such as a Markov Chain Monte Carlo model. The financial simulation model then analyzes the impact of user specified changes in value drivers on financial performance or generates a list of recommended changes to value drivers that achieve a user specified financial goal.

20 Claims, 23 Drawing Sheets

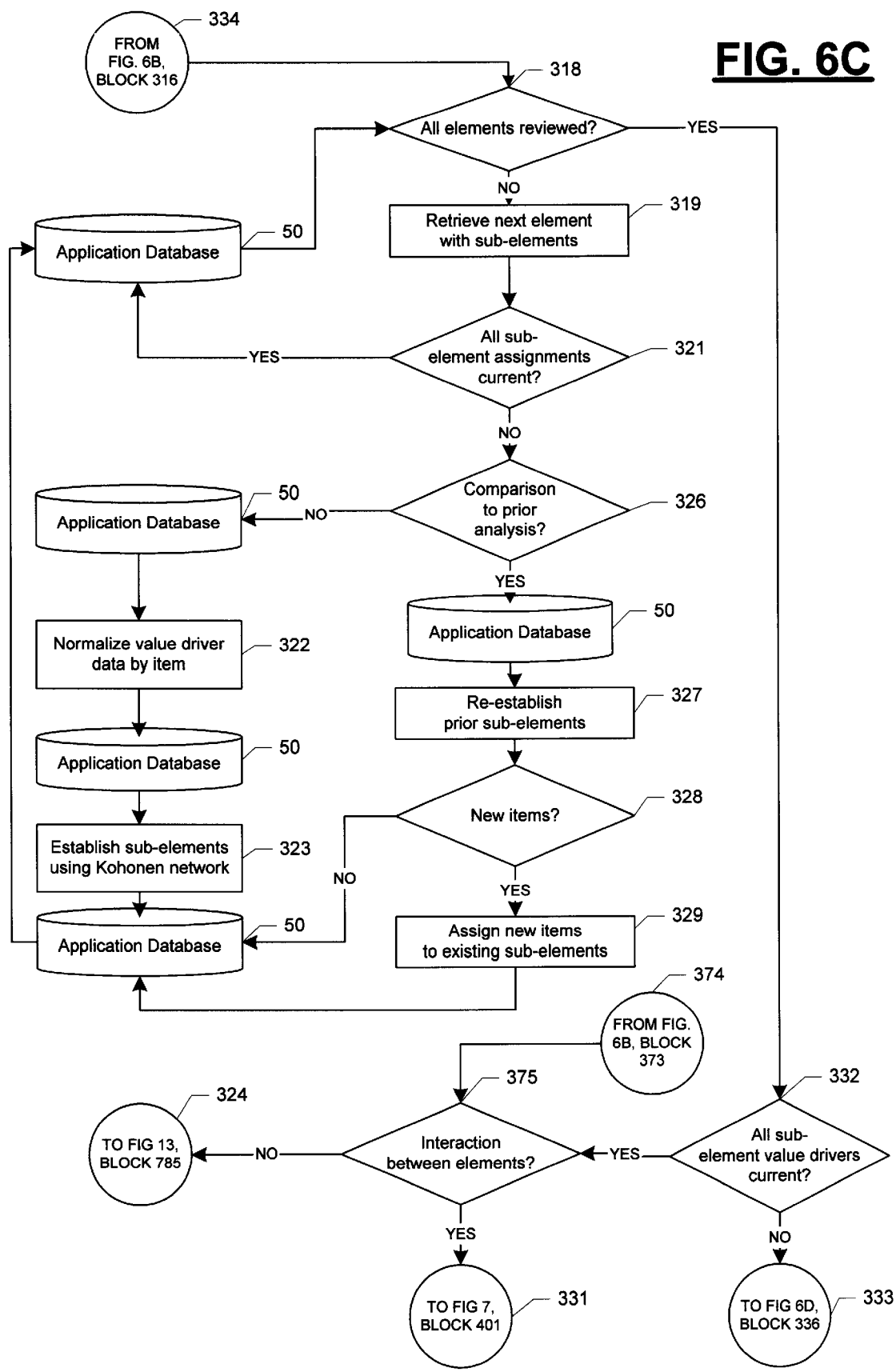

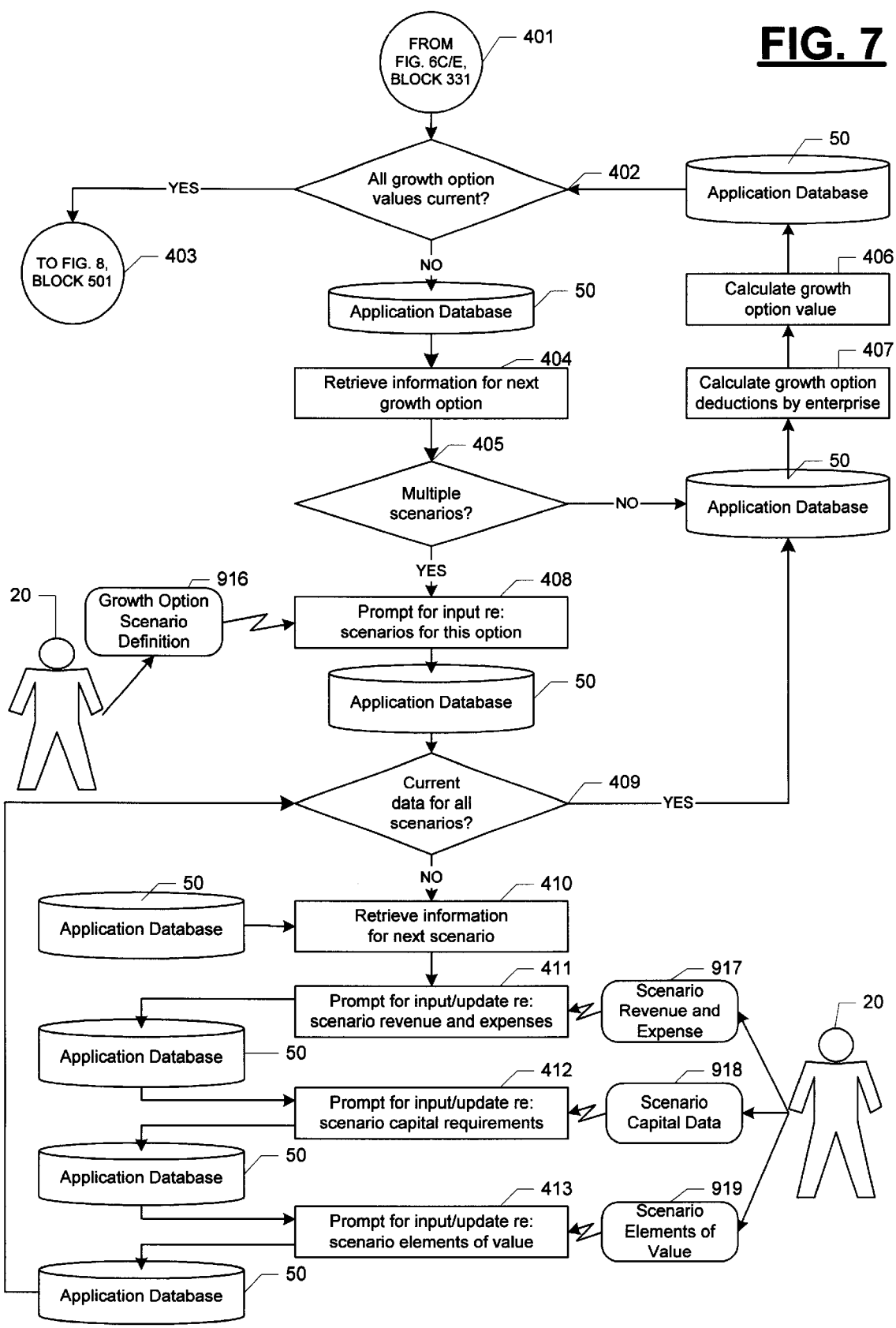

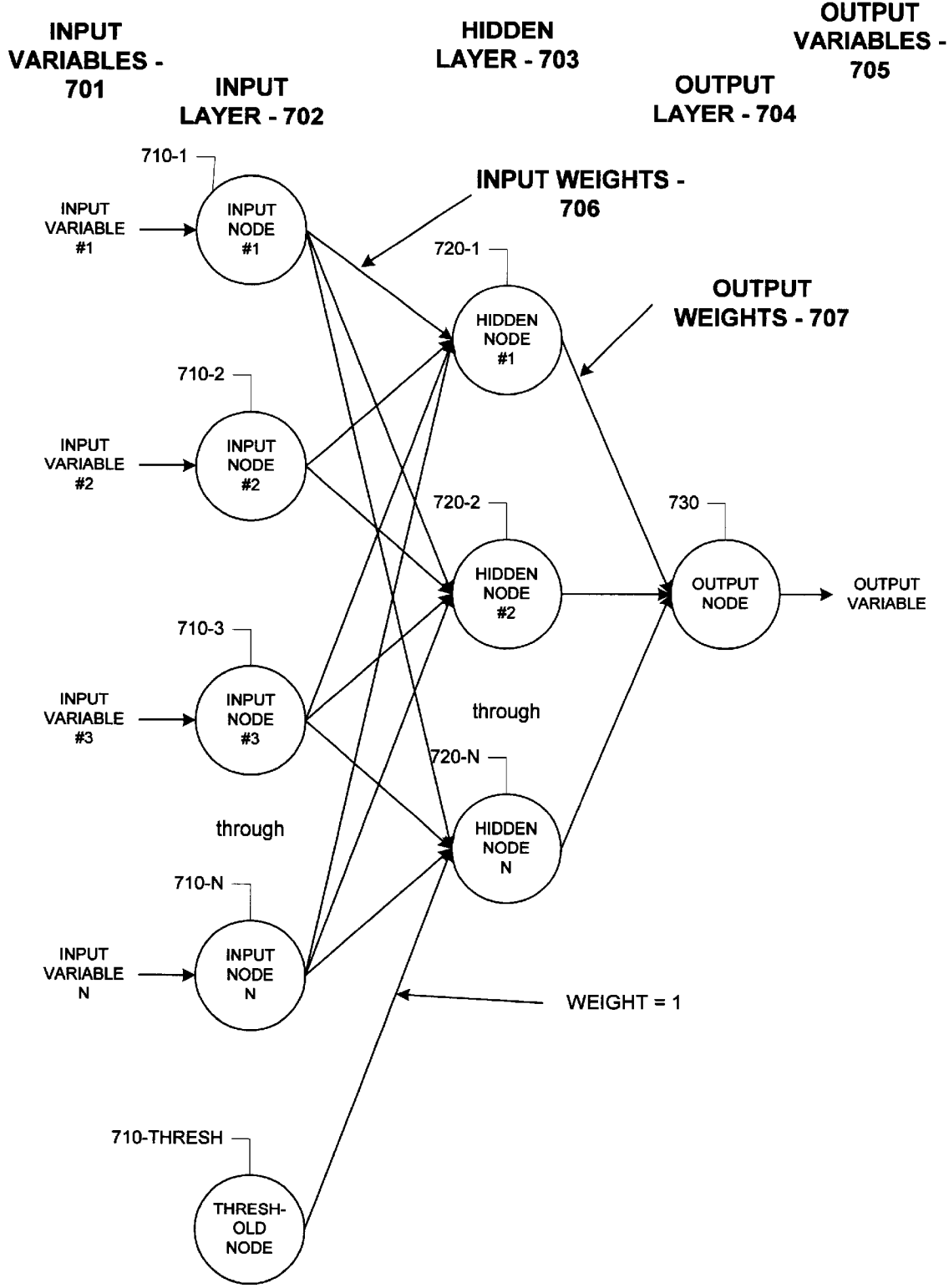

Value Map™ Report
XYZ Corporation

FIG. 14

| ASSETS | 12/31/XXXX | 12/31/XXXX |
|---|---|---|
| Cash and Marketable Securities: | $7,871,230 | $15,097,057 |
| Current Operation: | | |
| Financial Assets | | |
| - Accounts Receivable | $39,881,200 | $42,234,410 |
| - Inventory | $19,801,140 | $21,566,540 |
| - Property, Plant & Equipment | $22,800,000 | $21,221,190 |
| - Prepaid Expenses | $2,071,440 | $1,795,890 |
| Subtotal Financial Assets | $92,425,010 | $101,915,087 |
| Value Generating Assets | | |
| - Brandnames | $17,000,000 | $12,000,000 |
| - Customer Base | $62,000,000 | $49,500,000 |
| - Employees | $10,750,000 | $8,250,000 |
| - Strategic Alliances | $33,250,000 | $33,500,000 |
| - Vendors | $11,500,000 | $9,750,000 |
| - General Going Concern Value | $31,250,000 | $31,750,000 |
| Subtotal Value Generating Assets | $165,750,000 | $144,750,000 |
| Subtotal Current Operation | $258,175,010 | $246,665,087 |
| Growth Options: | | |
| GUI Market Option | $12,500,000 | $10,000,000 |
| IPX Market Option | $17,000,000 | $12,500,000 |
| Subtotal Growth Options | $29,500,000 | $22,500,000 |
| Total Assets | $287,675,010 | $269,165,087 |

| LIABILITIES & SHAREHOLDER EQUITY | | |
|---|---|---|
| Liabilities: | | |
| - Accounts Payable | $15,895,585 | $18,879,949 |
| - Salaries Payable | $8,766,995 | $10,468,305 |
| - Short Term Debt, Notes Payable | $20,189,900 | $11,506,130 |
| - Taxes Payable | $12,430,120 | $9,099,880 |
| Subtotal Short Term Liabilities | $57,282,600 | $49,954,264 |
| Long Term Debt | $17,800,000 | $20,916,650 |
| Total Liabilities | $75,082,600 | $70,870,914 |
| Shareholder's Equity: | | |
| - Stock | $2,000,000 | $2,000,000 |
| - Retained Earnings | $15,342,410 | $29,044,173 |
| - Economic Equity | $195,250,000 | $167,250,000 |
| Total Shareholder's Equity | $212,592,410 | $198,294,173 |
| Total Liabilities & Shareholder Equity | $287,675,010 | $269,165,087 |

Copyright, Jeff S. Eder 1996, All Rights Reserved

Statement of Change in Value
XYZ Corporation
January 1, XXXX to December 31, XXXX

FIG. 15

| | |
|---|---|
| Current Operation Cash Flow | $11,214,951 |
|   Accounts Receivable | $2,353,210 |
|   Inventory | $1,765,400 |
|   Property, Plant & Equipment | ($1,578,810) |
|   Prepaid Expenses | ($275,550) |
| Subtotal - Current Operation Asset Value Change | $2,264,250 |
|   Brand Names | ($5,000,000) |
|   Customer Base | ($12,500,000) |
|   Employees | ($2,500,000) |
|   Strategic Alliances | $250,000 |
|   Vendors | ($1,750,000) |
|   General Going Concern Value | $500,000 |
| Subtotal - Value Generating Asset Value Change | ($21,000,000) |
| Total Current Operation Value Change | ($7,520,799) |
| Growth Option Cash Flow | ($3,989,124) |
|   GUI Market Option | ($2,500,000) |
|   IPX Market Option | ($4,500,000) |
| Subtotal - Growth Option Value Change | ($7,000,000) |
| Total Growth Option Value Change | ($10,989,124) |
| Net Value Creation | ($18,509,923) |
| memo: GAAP net income | $24,770,852 |

Copyright, Jeff S. Eder 1996, All Rights Reserved

METHOD OF AND SYSTEM FOR MODELING AND ANALYZING BUSINESS IMPROVEMENT PROGRAMS

CROSS REFERENCE TO RELATED PATENT

This application is a continuation-in-part of: application Ser. No. 08/999,245 filed Dec. 10, 1997, application Ser. No. 08/779,109, filed Jan. 6, 1997 and application Ser. No. 08/539,020, filed Oct. 3, 1995, now abandoned. The subject matter of this application is also related to the subject matter of U.S. Pat. No. 5,615,109 for "Method of and System for Generating Feasible, Profit Maximizing Requisition Sets", by Jeff S. Eder, the disclosure of which is incorporated herein by reference.

BACKGROUND OF THE INVENTION

This invention relates to a computer based method of and system for evaluating the probable impact of user-specified or system generated changes in business value drivers on the other value drivers, the financial performance and the future value of a commercial enterprise.

Managing a business in a manner that creates long term value is a complex and time-consuming undertaking. This task is complicated by the fact that traditional financial systems don't provide sufficient information for managers in the information age to make the proper decisions. Many have noted that traditional accounting systems are driving information-age managers to make the wrong decisions and the wrong investments. Accounting systems are "wrong" for one simple reason, they track tangible assets while ignoring intangible assets. Intangible assets such as the skills of the workers, intellectual property, business infrastructure, databases, and relationships with customers and suppliers are not measured with current accounting systems. This oversight is critical because in the present economy the success of an enterprise is determined more by its ability to use its intangible assets than by its ability to amass and control the physical ones that are tracked by traditional accounting systems.

The recent experience of several of the leading U.S. companies, IBM, General Motors and DEC, illustrates the problems that can arise when intangible asset information is omitted from corporate financial statements. All three were showing large profits using current accounting systems while their businesses were deteriorating. If they had been forced to take write-offs when the declines in intangible assets were occurring, the problems would have been visible to the market and management would have been forced to act on them much sooner. These deficiencies of traditional accounting systems are particularly noticeable in high technology companies that are highly valued for their intangible assets and their options to enter new markets rather than their tangible assets.

The accounting profession itself recognizes the limitations of traditional accounting systems. A group of senior financial executives, educators and consultants that had been asked to map the future of financial management by the American Institute of Certified Public Accountants (AICPA) recently concluded that:

a) Operating managers will continue to lose confidence in traditional financial reporting systems, b) The motto of CFOs in the future will likely be "close enough is good enough", and c) The traditional financial report will never again be used as the exclusive basis for any business decisions.

The deficiency of traditional accounting systems is also one of the root causes of the short term focus of many American firms. Because traditional accounting methods ignore intangible assets, expenditures that develop a market or expand the capabilities of an organization are generally shown as expenses that only decrease the current period profit. For example, an expenditure for technical training which increases the value of an employee to an enterprise is an expense while an expenditure to refurbish a piece of furniture is capitalized as an asset.

Even when intangible assets have been considered, the limitations in the existing methodology have severely restricted the utility of the information that has been produced. All known prior efforts to value individual intangible assets have been restricted to independent valuations of different types of assets with only limited attempts to measure the actual impact of the asset on the enterprise that owns it. Some of the intangible assets that have been valued separately in this fashion are: brand names, customers and intellectual property. Problems associated with the known methods for valuing intangible assets include:

1. Interaction between intangible assets is ignored, for example the value of a brand name is in part a function of the customers that use the product—the more prestigious the customers, the stronger the brand name. In a similar fashion the stronger the brand name, the more likely it will be that customers will stay a long time. Valuing either of these assets in isolation will give the wrong answer; and;

2. The value of an intangible asset is a function of the benefit that it provides the enterprise. Therefore, measuring the value of an intangible asset requires a method for measuring the actual impact of the asset on the enterprise—something that is missing from known existing methods.

The historical dependence on accounting records for evaluating business enterprises has to some extent been a matter of simple convenience. Because corporations are required to maintain financial records for tax purposes, accounting statements are available for virtually every company. At the same time, the high cost of data storage has until recently prevented the more detailed information required for valuing intangibles from being readily available. In a similar manner, the absence of integrated corporate databases within corporations and the home-grown nature of most corporate systems has until recently made it difficult to compare similar data from different firms. Unfortunately, even the firms that have established integrated business management systems find that retrieving the information required to perform an integrated analysis of their data is a cumbersome task. These firms also find that there are few tools that facilitate the analysis of the information after it is gathered together in one place.

The lack of a consistent, well accepted, realistic method for measuring all the elements of business performance and value creation also prevents some firms from receiving the financing they need to grow. Most banks and lending institutions focus on book value when evaluating the credit worthiness of a business seeking funds. As stated previously, the value of many high technology firms lies primarily in intangible assets and growth options that aren't visible under traditional definitions of accounting book value. As a result, these businesses generally aren't eligible to receive capital from traditional lending sources, even though their financial prospects are generally far superior to those of companies with much higher tangible book values.

Many have begun using business valuations to obtain at least some of the information that is missing from traditional financial systems. Business valuations determine the price that a hypothetical buyer would pay for a business under a given set of circumstances. The volume of business valuations being performed each year is increasing significantly. A leading cause of this growth in volume is the increasing use of mergers and acquisitions as vehicles for corporate growth. Business valuations are frequently used in setting the price for a business that is being bought or sold. As discussed previously, another reason for the growth in the volume of business valuations has been their increasing use in areas other than supporting merger and acquisition transactions. For example, business valuations are now being used by financial institutions to determine the amount of credit that should be extended to a company, by courts in determining litigation settlement amounts and by investors in evaluating the performance of company management.

In most cases, a business valuation is completed by an appraiser or a Certified Public Accountant (hereinafter, appraiser) using a combination of judgment, experience and an understanding of generally accepted valuation principles. The two primary types of business valuations that are widely used and accepted are income valuations and asset valuations. Market valuations are also used in some cases but their use is restricted because of the difficulty inherent in trying to compare two different companies.

Income valuations are based on the premise that the current value of a business is a function of the future value that an investor can expect to receive from purchasing all or part of the business. Income valuations are the most widely used type of valuation. They are generally used for valuing businesses that are expected to continue operating for the foreseeable future. In these valuations the expected returns from investing in the business and the risks associated with receiving the expected returns are evaluated by the appraiser. The appraiser then determines the value whereby a hypothetical buyer would receive a sufficient return on the investment to compensate the buyer for the risk associated with receiving the expected returns. Income valuation methods include the capitalization of earnings method, the discounted future income method, the discounted cash flow method, the economic income method and other formula methods.

Asset valuations consider the business to be a collection of assets which have an intrinsic value to a third party in an asset sale. Asset valuations are typically used for businesses that are ceasing operation and for specific type of businesses such as holding companies and investment companies. Asset valuation methods include the book value method, the adjusted book value method, the economic balance sheet method and the liquidation method.

Market valuations are used to place a value on one business by using valuations that have been established for comparable businesses in either a public stock market or a recent transaction. This method is difficult to use properly because no two companies are exactly the same and no two transactions are completed for the exact same reasons. Market valuation methods include the price to earnings method, the comparable sales method, industry valuation methods and the comparable investment method.

When performing a business valuation, the appraiser is generally free to select the valuation type and method (or some combination of the methods) in determining the business value. Under the current procedures, there is no correct answer, there is only the best possible informed guess for any given business valuation. There are several difficulties inherent in this approach. First, the reliance on informed guessing places a heavy reliance on the knowledge and experience of the appraiser. The recent increase in the need for business valuations has strained the capacity of existing appraisal organizations. As a result, the average experience level of those performing the valuations has decreased. The situation is even worse for many segments of the American economy where experienced appraisers don't exist because the industries are too new. Another drawback of the current procedures for completing a valuation is that the appraiser is typically retained and paid by a party to a proposed transaction. It is difficult in this situation to be certain that the valuation opinion is unbiased and fair. Given the appraisers wide latitude for selecting the method, the large variability of experience levels in the industry and the high likelihood of appraiser bias, it is not surprising that it is generally very difficult to compare the valuations of two different appraisers—even for the same business. These limitations in turn serve to seriously diminish the usefulness of business valuations to business managers, business owners and financial institutions.

The usefulness of business valuations to business owners and managers is limited for another reason—valuations typically determine only the value of the business as a whole. To provide information that would be useful in improving the business, the valuation would have to furnish supporting detail that would highlight the value of different elements of the business. An operating manager would then be able to use a series of business valuations to identify elements within a business that have been decreasing in value. This information could also be used to identify corrective action programs and to track the progress that these programs have made in increasing business value. This same information could also be used to identify elements that are contributing to an increase in business value. This information could be used to identify elements where increased levels of investment would have a significant favorable impact on the overall health of the business.

Finally, it is worth noting that the limitiations of the general ledger accounting systems discussed previously (lack of information about intangible assets) also extend to the business valuations that are completed based largely on the information provided by general ledger systems. Unfortunately, these same limitations also extend to the all known efforts to analyze and/or simulate the impact of changes in business on financial performance and value creation. Put simply—it's impossible to analyze the impact on aspects of the business with no prior information.

The lack of detailed information on intangible assets and their impact on value creation has limited simulation products such as the Small Business Financial Manager to projecting the impact of changes in revenue, expense or balance sheet items (tangible assets and financial liabilities) on financial performance. Given the growing importance of intangible assets to financial performance and value creation, the utility of these systems is very limited. In a similar manner the lack of quantitative information on the impact of intangibles on financial performance has limited the usefulness of simulation products such as Tango that incorporate generic information regarding intangibles.

In light of the preceding discussion, it is clear that it would be desirable to have an automated system that simulated the impact of proposed changes in business operation on the value drivers, the financial performance and the future value of a commercial enterprise that was enabled by a detailed, rigorous evaluation of all the elements of the enterprise that create business value. Ideally, this system would be capable of generating detailed simulations for businesses in new industries.

SUMMARY OF THE INVENTION

It is a general object of the present invention to provide a novel and useful system that calculates and displays a forecast of the impact of user-specified or system generated changes in business value drivers on the other value drivers, the elements, the financial performance and the long term value of a commercial enterprise that utilizes the information from a detailed valuation of the enterprise to overcome the limitations and drawbacks of the prior art that were described previously.

A preferable object to which the present invention is applied is the analysis of changes to a high technology commercial enterprise where a significant portion of the business value is associated with intangible assets.

The present invention eliminates a great deal of time-consuming and expensive effort by automating the extraction of transaction data from the databases, tables, and files of the existing computer-based corporate finance, operation, sales, and human resource software databases as required to operate the system. In accordance with the invention, the automated extraction, aggregation and analysis of transaction data from a variety of existing computer-based systems significantly increases the scale and scope of the analysis that can be completed. The system of the present invention further enhances the efficiency and effectiveness of the business simulation and analysis by automating the retrieval, storage and analysis of information useful for valuing intangible assets from external databases and publications via the internet or other external networks.

Uncertainty over which method is being used for completing the analysis and the resulting inability to compare different simulations is eliminated in the present invention by consistently utilizing different valuation methodologies for valuing the different elements of the enterprise as shown in Table 1.

TABLE 1

| Enterprise element | | Valuation methodology |
|---|---|---|
| •Excess Cash & Marketable Securities | | GAAP |
| •Total current-operation value (COPTOT): | | Income valuation* |
| Current-operation: | Cash & Marketable Securities CASH | GAAP |
| Current-operation: | Accounts Receivable (AR) | GAAP |
| Current-operation: | Inventory (IN) | GAAP |
| Current-operation: | Prepaid Expenses (PE) | GAAP |
| Current-operation: | Production Equipment (PEQ) | If correlation value > liquidation value, then use correlation valuation, else use liquidation value |
| Current-operation: | Other Physical Assets (OPA) | Liquidation Value |
| Current-operation: | Other Assets (OA) | GAAP |
| Current-operation: | Intangible Assets (IA): | |
| | Customers | Correlation to component(s) of value |
| | Employees | Correlation to component(s) of value |
| | Vendor Relationships | Correlation to component(s) of value |
| | Strategic Partnerships | Correlation to component(s) of value |
| | Brand Names | Correlation to component(s) of value |

TABLE 1-continued

| Enterprise element | | Valuation methodology |
|---|---|---|
| | Other Intangibles | Correlation to component(s) of value |
| Current-operation: | General going concern value (GCV) | GCV = COPTOT − CASH − AR − IN − PE − PEQ − OPA − OA − IA |
| •Growth options | | Option pricing algorithms |

*The user also has the option of specifying the total value

The value of an enterprise operation is calculated by summing items from Table 1 as shown in Table 2.

TABLE 2

| Enterprise Value = |
|---|
| Current value of enterprise excess cash and marketable securities |
| + |
| Value of current-operation |
| + |
| Value of growth options |

As shown in Table 1, the growth opportunities of the firm are valued using option pricing algorithms. Option pricing algorithms are improvements over traditional methods as they correct two inaccurate assumptions implicit in traditional discounted cash flow analyses of business growth opportunities, namely: the assumption that investment decisions are reversible, and the assumption that investment decisions can not be delayed. In reality, a firm with a project that requires an investment has the right but not the obligation to buy an asset at some future time of its choosing. However, once the investment is made it is often irreversible—a situation analogous to a call option. Because option valuation algorithms explicitly recognize that investments of this type are often irreversible and that they can be delayed, the asset values calculated using these algorithms are more accurate than valuations created using more traditional approaches. The use of option pricing analysis for valuing growth opportunities (hereinafter, growth options) gives the present invention a distinct advantage over traditional approaches to business valuation.

The innovative system has the added benefit of providing a large amount of detailed information concerning both tangible and intangible elements of enterprise business value. The system also gives the user the ability to track the changes in elements of business value and total business value over time by comparing the current valuation to previously calculated valuations. As such, the system also provides the user with an alternative mechanism for tracking financial performance. To facilitate its use as a tool for improving the value of an enterprise, the system of the present invention produces reports in formats that are similar to the reports provided by traditional accounting systems. The method for tracking the elements of value for a business enterprise provided by the present invention eliminates many of the limitations associated with current accounting systems that were described previously. The detailed valuation also enables a more robust and accurate simulation of future financial performance based on user-specified or system generated changes in value drivers. This capability gives information age managers the tools they need to go beyond tangible asset management and manage all the elements of their operations—tangible and intangible.

BRIEF DESCRIPTION OF DRAWINGS

These and other objects, features and advantages of the present invention will be more readily apparent from the following description of the preferred embodiment of the invention in which:

FIG. 6A, FIG. 6B, FIG. 6C, FIG. 6D and FIG. 6E are block diagrams showing the sequence of steps in the present invention that are utilized in identifying the value drivers and defining the composite variables;

FIG. 7 is a block diagram showing the sequence of steps in the present invention used for the specification and valuation of growth options;

FIG. 10 is a diagram illustrating the processing of a feed-forward neural network;

FIG. 14 is a sample Value Map® report from the present invention showing the calculated value for all elements of value in the total company on the valuation date;

FIG. 15 is a sample Value Creation report from the present invention detailing the changes in the elements of value and total company value from a prior date to the valuation date.

DETAILED DESCRIPTION OF THE PREFERRED EMBODIMENT

Figure 1:
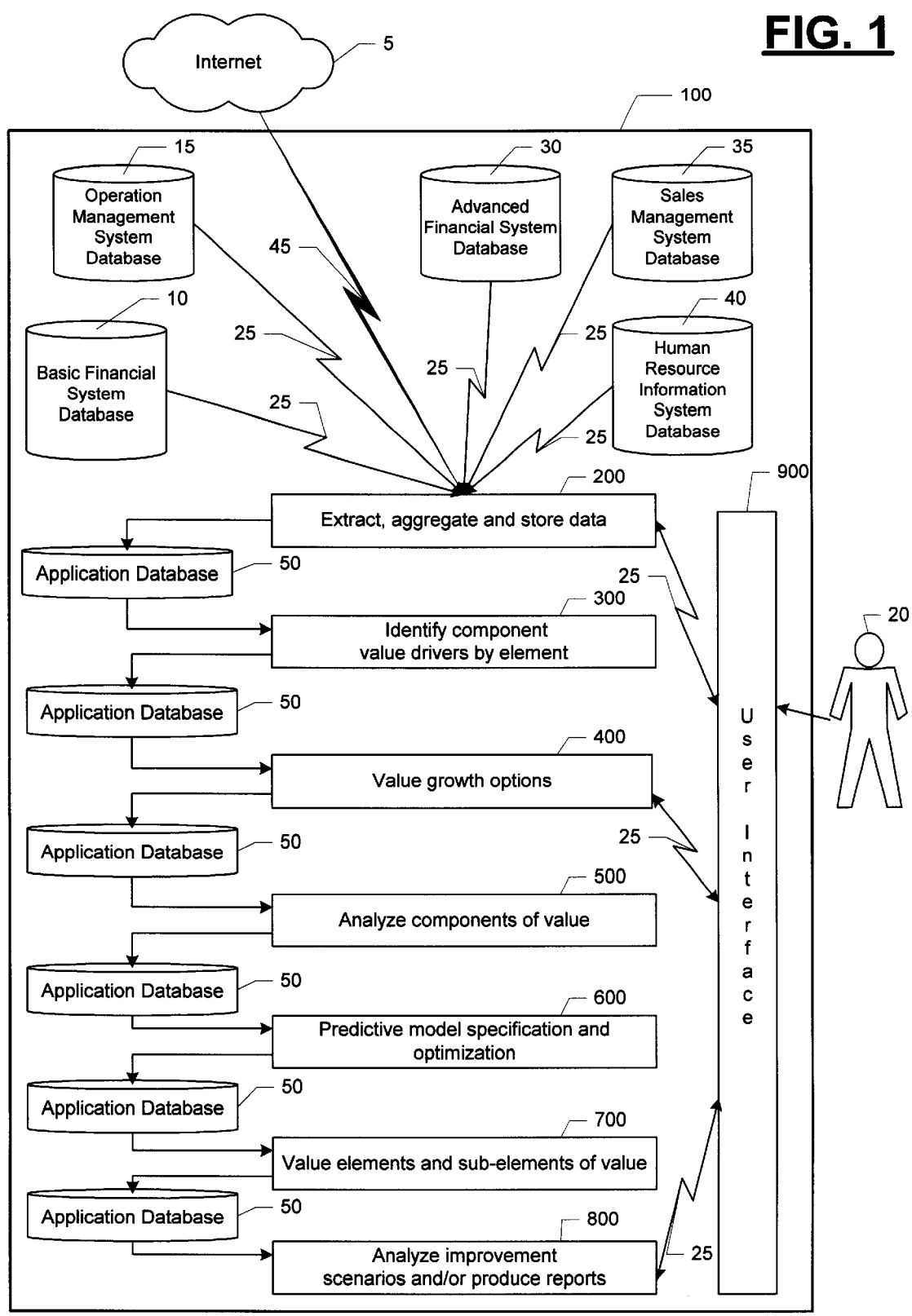
FIG. 1 is a block diagram showing the major processing steps of the present invention.

FIG. 1 provides an overview of the processing completed by the innovative system for business simulation and analysis. In accordance with the present invention, an automated method of and system (100) for business valuation is provided. Processing starts in this system (100) with a block of software (200) that extracts, aggregates and stores the transaction data and user input required for completing a valuation. This information is extracted via an interconnection network (25) from a basic financial system database (10), an operation management system database (15), an advanced financial system database (30), a sales management system database (35), and a human resource information system database (40). Information can also be extracted from an on-line external database such as those found on an internet (5) via a communications link (45). These information extractions and aggregations are guided by a user (20) through interaction with a user-interface portion of the application software (900) that mediates the display and transmission of all information to the user (20) from the system (100) as well as the receipt of information into the system (100) from the user (20) using a variety of data windows tailored to the specific information being requested or displayed in a manner that is well known. While only one database of each type (10, 15, 30, 35 & 40) is shown in FIG. 1, it is to be understood that the system (100) can extract data from multiple databases of each type via the interconnection network (25).

Figure 2:
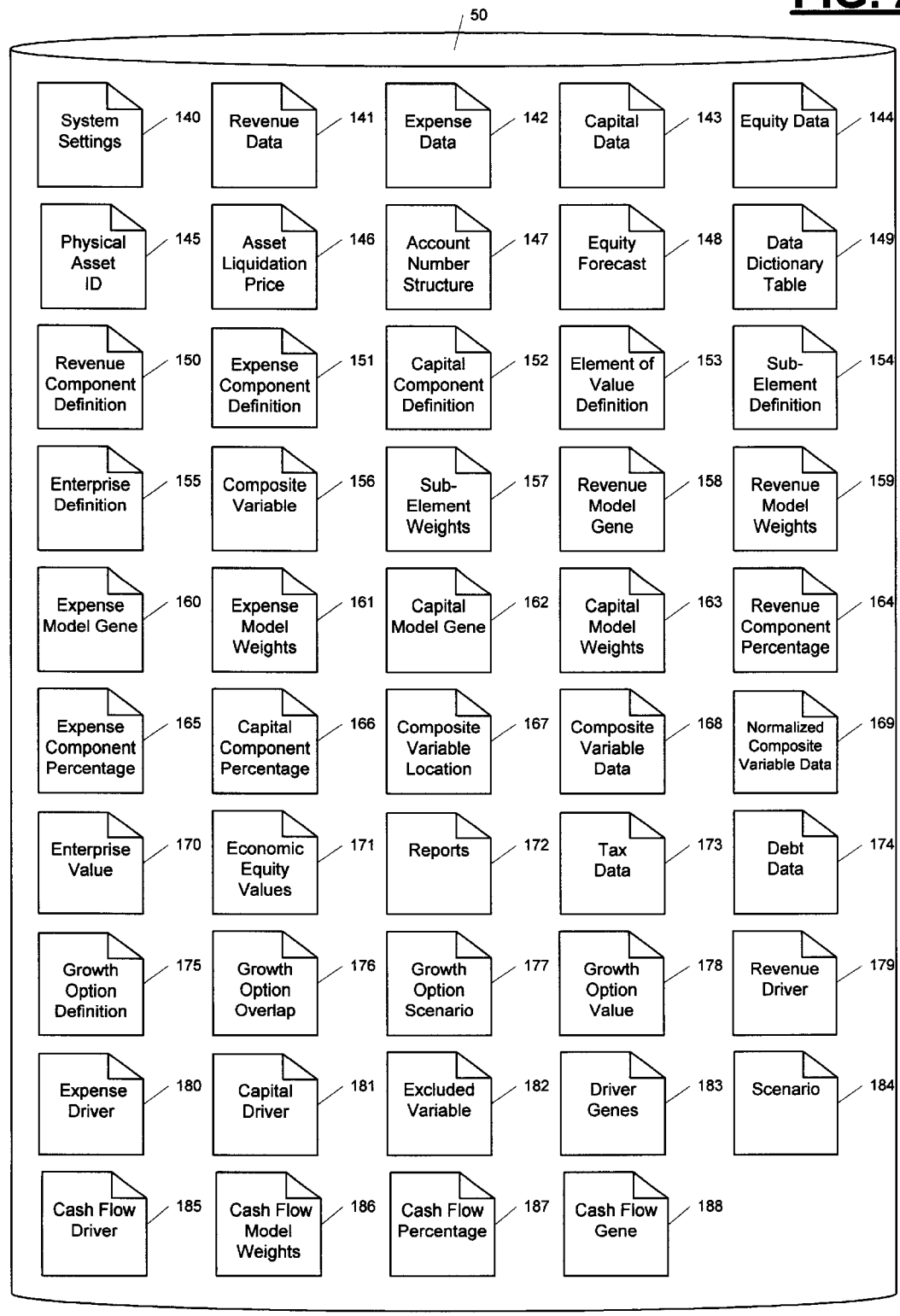
FIG. 2 is a diagram showing the files or tables in the application database of the present invention that are utilized for data storage and retrieval during the processing that values elements of the enterprise.

All extracted information concerning revenue, expenses, capital and elements of value is stored in a file or table (hereinafter, table) within an application database (50) as shown in FIG. 2. The application database (50) contains tables for storing user input, extracted information and system calculations including a system settings table (140), a revenue data table (141), an expense data table (142), a capital data table (143), an equity data table (144), a physical asset ID table (145), an asset liquidation price table (146), an account number structure table (147), an equity forecast table (148), a data dictionary table (149), a revenue component definition table (150), an expense component definition table (151), a capital component definition table (152), an element of value definition table (153), a sub-element definition table (154), an enterprise definition table (155), a composite variable table (156), a sub-element weights table (157), a revenue model gene table (158), a revenue model weights table (159), an expense model gene table (160), an expense model weights table (161), a capital model gene table (162), a capital model weights table (163), a revenue component percentage table (164), an expense component percentage table (165), a capital component percentage table (166), a composite variable location table (167), a composite variable data table (168), a normalized composite variable data table (169), an enterprise value table (170), an economic equity values table (171), a reports table (172), a tax data table (173), a debt data table (174), a growth option definition table (175), a growth option overlap table (176), a growth option scenario table (177), a growth option value table (178), a revenue driver table (179), an expense driver table (180), a capital driver table (181), an excluded variable table (182), a driver genes table (183) and a scenario table (184). The application database (50) can optionally exist as a datamart, data warehouse or departmental warehouse. The system of the present invention has the ability to accept and store supplemental or primary data directly from user input, a data warehouse or other electronic files in addition to receiving data from the databases described previously. The system of the present invention also has the ability to complete the necessary calculations without receiving data from one or more of the specified databases. However, in the preferred embodiment all required information is obtained from the specified databases (5, 10, 15, 30, 35 & 40).

Figure 3:
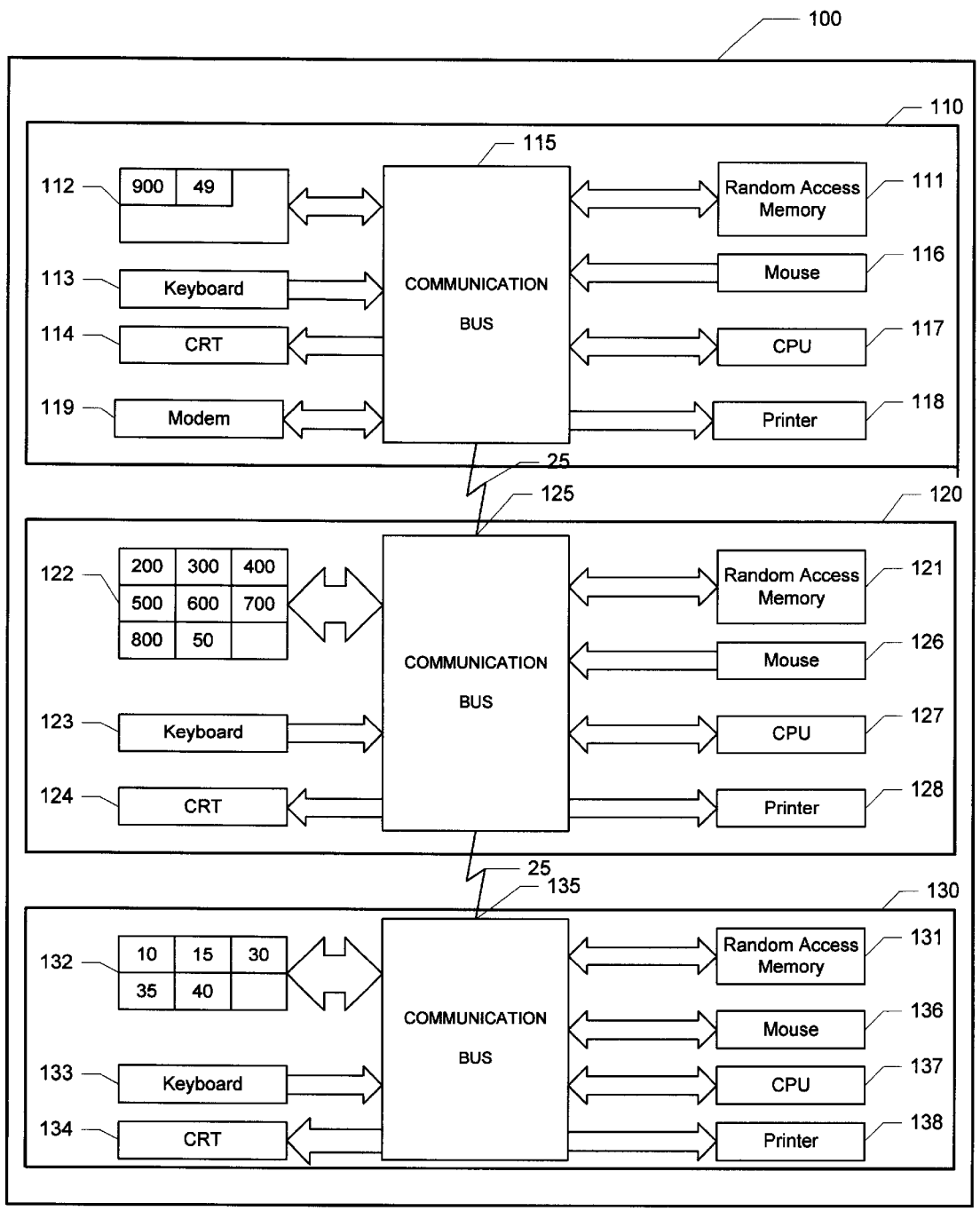
FIG. 3 is a block diagram of an implementation of the present invention.
Figure 4:
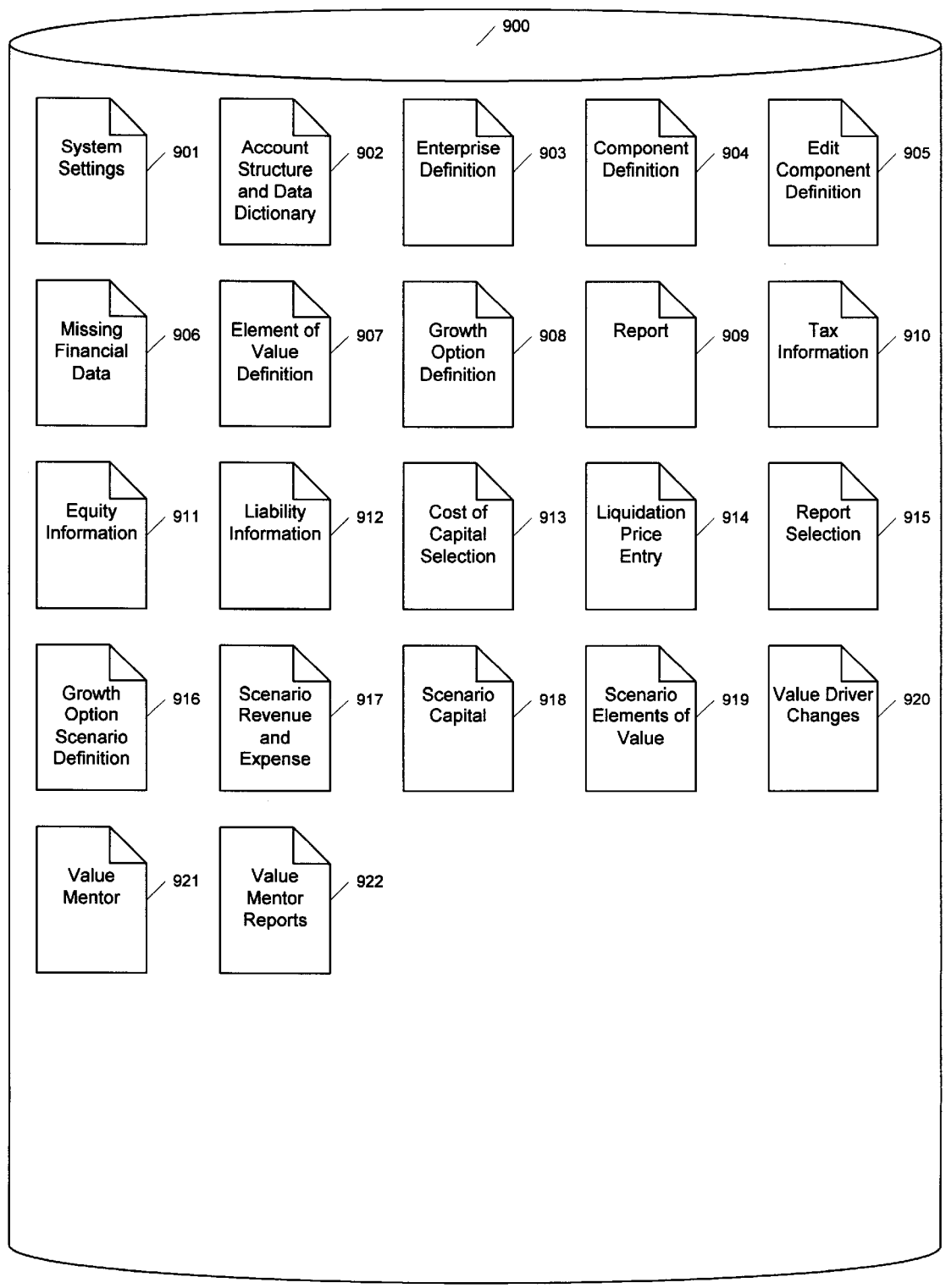
FIG. 4 is a diagram showing the data windows that are used for receiving information from and transmitting information to the user during system processing.

As shown in FIG. 3, the preferred embodiment of the present invention is a computer system (100) illustratively comprised of a client personal computer (110) connected to an application server personal computer (120) via an interconnection network (25). The application server personal computer (120) is in turn connected via the interconnection network (25) to a database-server personal computer (130).

The database-server personal computer (130) has a CPU (136), a keyboard (132), a CRT display (133), a printer (137), a hard drive (131) for storage of the basic financial system database (10), the operation management system database (15), the advanced financial system database (30), the sales management system database (35) and the human resource information system database (40), a communications bus (134) and a read/write random access memory (135).

The application-server personal computer (120) has a CPU (127), a keyboard (123), a mouse (126), a CRT display (124), a printer (128), a hard drive (122) for storage of the application database (50) and the majority of the application software (200, 300, 400, 500, 600, 700 and 800) of the present invention, a communications bus (125) and a read/write random access memory (121). While only one client personal computer is shown in FIG. 3, it is to be understood that the application-server personal computer (120) can be networked to fifty or more client personal computers (110) via the interconnection network (25). The application-server personal computer (120) can also be networked to fifty or more server, personal computers (130) via the interconnection network (25). It is to be understood that the diagram of FIG. 3 is merely illustrative of one embodiment of the present invention.

The client personal computer (110) has a CPU (117), a keyboard (113), a mouse (116), a CRT display (114), a printer (118), a modem (119), a hard drive (112) for storage of a client data-base (49) and the user-interface portion of the application software (900), a communications bus (115) and a read/write random access memory (111).

The application software (200, 300, 400, 500, 600, 700, 800 and 900) controls the performance of the central processing unit (127) as it completes the calculations required to calculate the detailed business valuation. In the embodiment illustrated herein, the application software program (200, 300, 400, 500, 600, 700, 800 and 900) is written in a combination of PowerScript, C++ and Visual Basic®. The application software (200, 300, 400, 500, 600, 700, 800 and 900) also uses Structured Query Language (SQL) for extracting data from other databases (10, 15, 30, 35 and 40) and then storing the data in the application database (50) or for receiving input from the user (20) and storing it in the client database (49). The other databases contain information regarding historical financial performance (10), operation management records (15), forecast financial performance (30), sales prospects and transactions (35) and the company employees (40) that are used in the operation of the system (100). The user (20) provides the information the application software requires to determine which data need to be extracted and transferred from the database-server hard drive (131) via the interconnection network (25) to the application-server computer hard drive (122) by interacting with user-interface portion of the application software (900). The extracted information is combined with input received from the keyboard (113) or mouse (116) in response to prompts from the user-interface portion of the application software (900) before processing is completed.

User input is initially saved to the client database (49) before being transmitted to the communication bus (125) and on to the hard drive (122) of the application-server computer via the interconnection network (25). Following the program instructions of the application software, the central processing unit (127) accesses the extracted data and user input by retrieving it from the hard drive (122) using the random access memory (121) as computation workspace in a manner that is well known.

The computers (110, 120 and 130) shown in FIG. 3 illustratively are IBM PCs or clones or any of the more powerful computers or workstations that are widely available. Typical memory configurations for client personal computers (110) used with the present invention should include at least 32 megabytes of semiconductor random access memory (111) and at least a 2 gigabyte hard drive (112). Typical memory configurations for the application-server personal computer (120) used with the present invention should include at least 64 megabytes of semiconductor random access memory (121) and at least a 50 gigabyte hard drive (122). Typical memory configurations for the database-server personal computer (130) used with the present invention should include at least 128 megabytes of semiconductor random access memory (135) and at least a 200 gigabyte hard drive (131).

Using the system described above, the value of the enterprise will be further broken down into tangible and intangible elements of value. As shown in Table 1, the value of the current-operation will be calculated using an income valuation model. An integral part of most income valuation models is the calculation of the present value of the expected cash flows, income or profits associated with the current-operation. The present value of a stream of cash flows is calculated by discounting the cash flows at a rate that reflects the risk associated with realizing the cash flow. For example, the present value (PV) of a cash flow of ten dollars ($10) per year for five (5) years would vary depending on the rate used for discounting future cash flows as shown below.

$$\text{Discount rate} = 25\%$$

$$PV = \frac{10}{1.25} + \frac{10}{(1.25)^2} + \frac{10}{(1.25)^3} + \frac{10}{(1.25)^4} + \frac{10}{(1.25)^5} = 26.89$$

$$\text{Discount rate} = 35\%$$

$$PV = \frac{10}{1.35} + \frac{10}{(1.35)^2} + \frac{10}{(1.35)^3} + \frac{10}{(1.35)^4} + \frac{10}{(1.35)^5} = 22.20$$

The first step in evaluating the elements of current-operation value is separating the underlying formula that defines the value of the current-operation as shown in Table 3.

TABLE 3

Value of current-operation =

(R) Value of expected revenue from current-operation
+
(E) Value of expected expense for current-operation
+
(C) Value of capital required to support current-operation*

*Note: (C) can have a positive or negative value

The three components of current-operation value will be referred to as the revenue value (R), the expense value (E) and the capital value (C). Examination of the equation in Table 3 shows that there are three ways to increase the value of the current-operation—increase the revenue, decrease the expense or decrease the capital requirements (note: this statement ignores a fourth way to increase value—decrease interest rate used for discounting future cash flows).

While it is possible to break each component down into a large number of sub-components for analysis, the preferred embodiment has a pre-determined number of sub-components for each component of value. The revenue value is not subdivided. The expense value is subdivided into five sub-components: the cost of raw materials, the cost of manufacture or delivery of service, the cost of selling, the cost of support and the cost of administration. The capital value is subdivided into six sub-components: cash, non-cash financial assets, production equipment, other assets (non financial, non production assets), financial liabilities and equity. The production equipment and equity sub-components are not used directly in evaluating the elements of value.

The components and sub-components of current-operation value will be used in calculating the value of the tangible and intangible elements of value. For the calculations completed by the present invention, an element of value will be defined as "an identifiable entity or group that as a result of past transactions has provided and is expected to provide economic benefit to the enterprise." An item will be defined as a single member of the group that defines an element of value. For example, an individual salesman would be an "item" in the "element of value" sales staff. Predictive models are used to determine the percentage of: the revenue value, the expense value sub-components, and the capital value sub-components that are attributable to each element of value. The resulting values will then be added together to determine the valuation for different elements as shown by the example in Table 4.

TABLE 4

Valuation of the Large, Loyal Customer Element

| | | |
|---|---|---|
| Revenue value = $120M | 13% attributed to large, loyal customers | Value = $15.6 M |
| Expense value = ($80M) | 10% attributed to large, loyal customers | Value = ($8) M |
| Capital value = ($5M) | 12% attributed to large, loyal customers | Value = ($.6) M |
| Total value = $35M | Large, Loyal Customer Element Value = $ 7 M | |

Figure 5A:
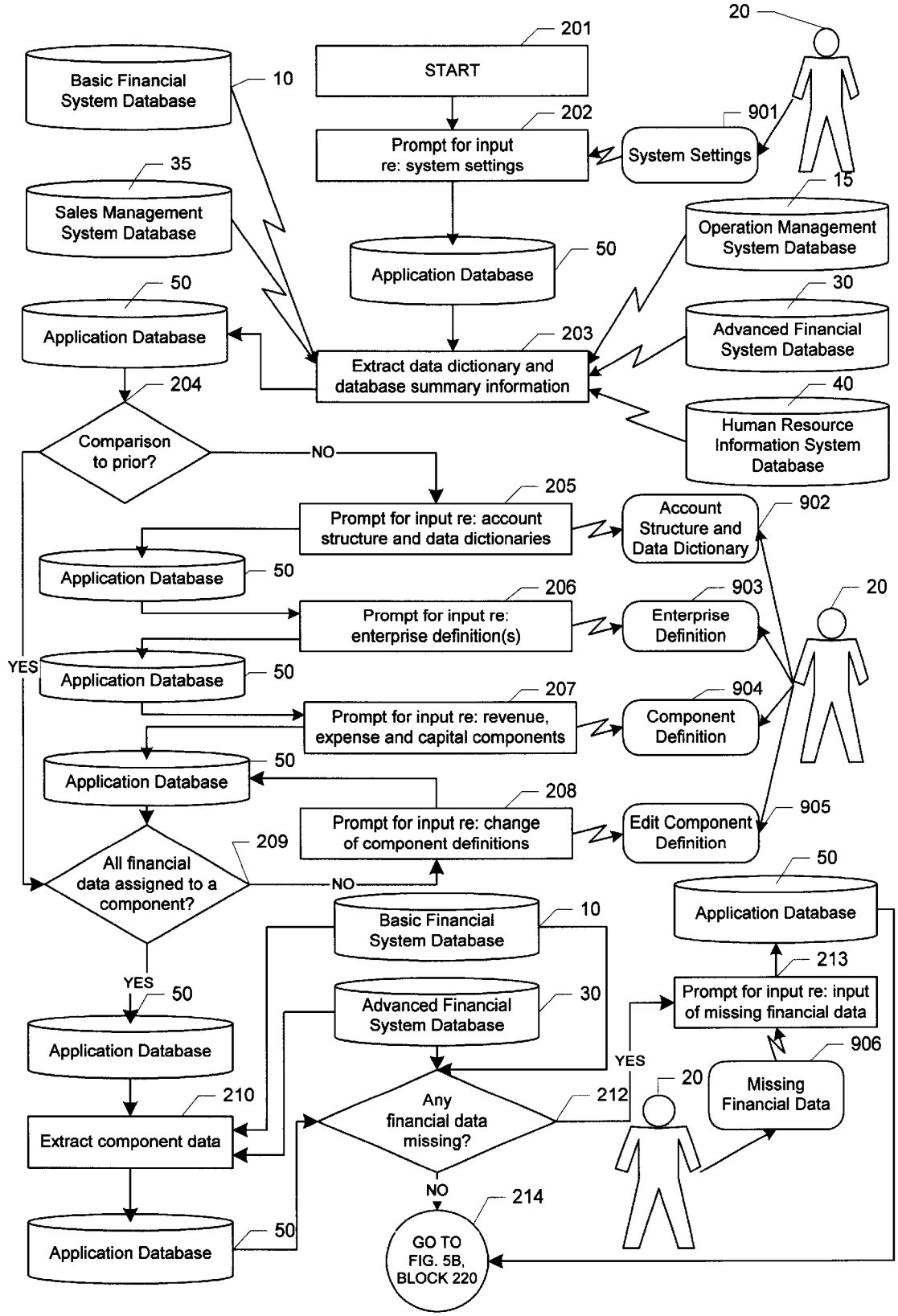
FIG. 5A and FIG. 5B are block diagrams showing the sequence of steps in the present invention used for extracting, aggregating and storing information utilized in system processing from: user input, the basic financial system database, the operation management system database, the advanced financial system database, the sales management system database, external databases via the internet and the human resource information system database.
Figure 5B:
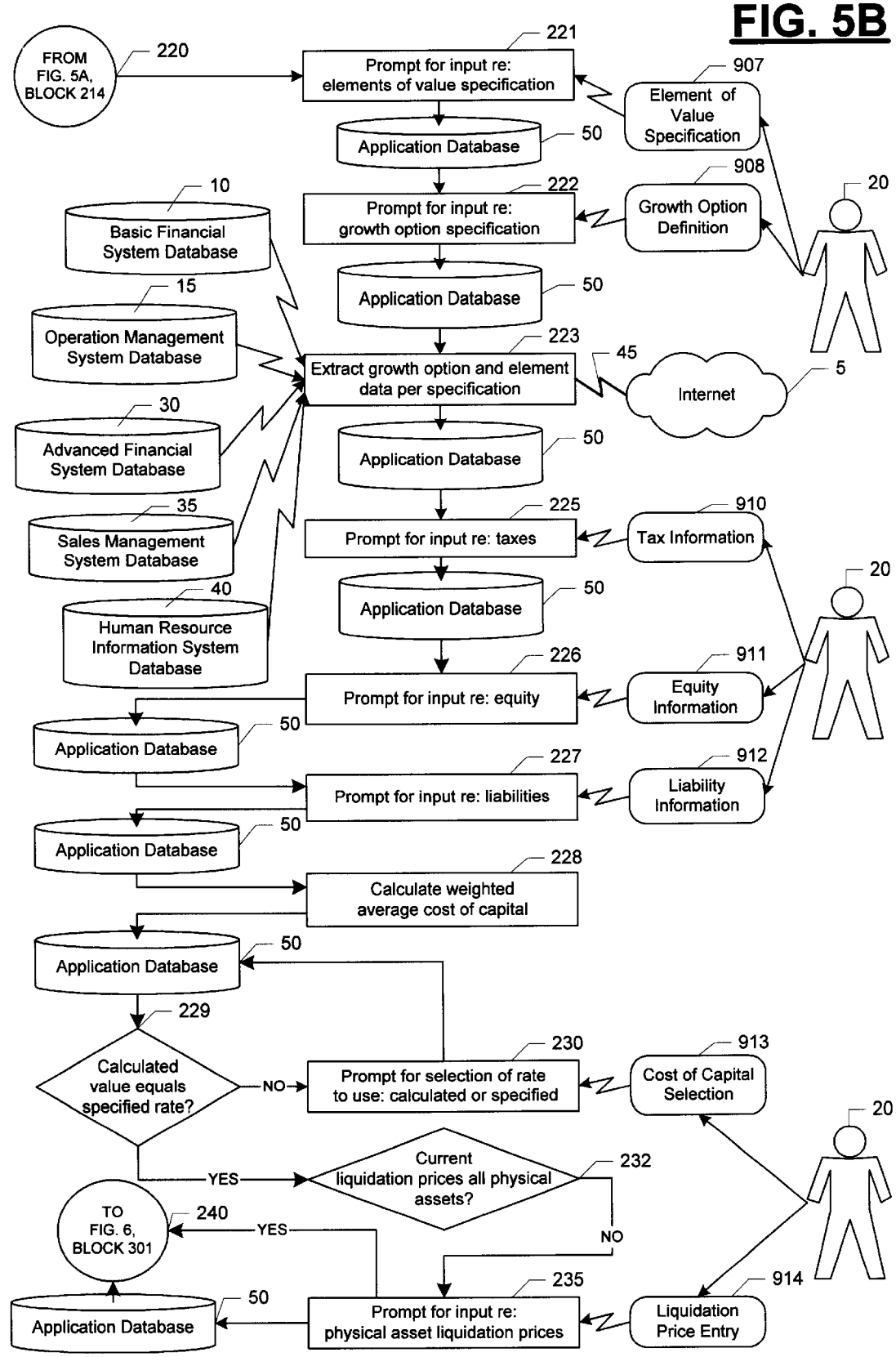
Figure 6A:
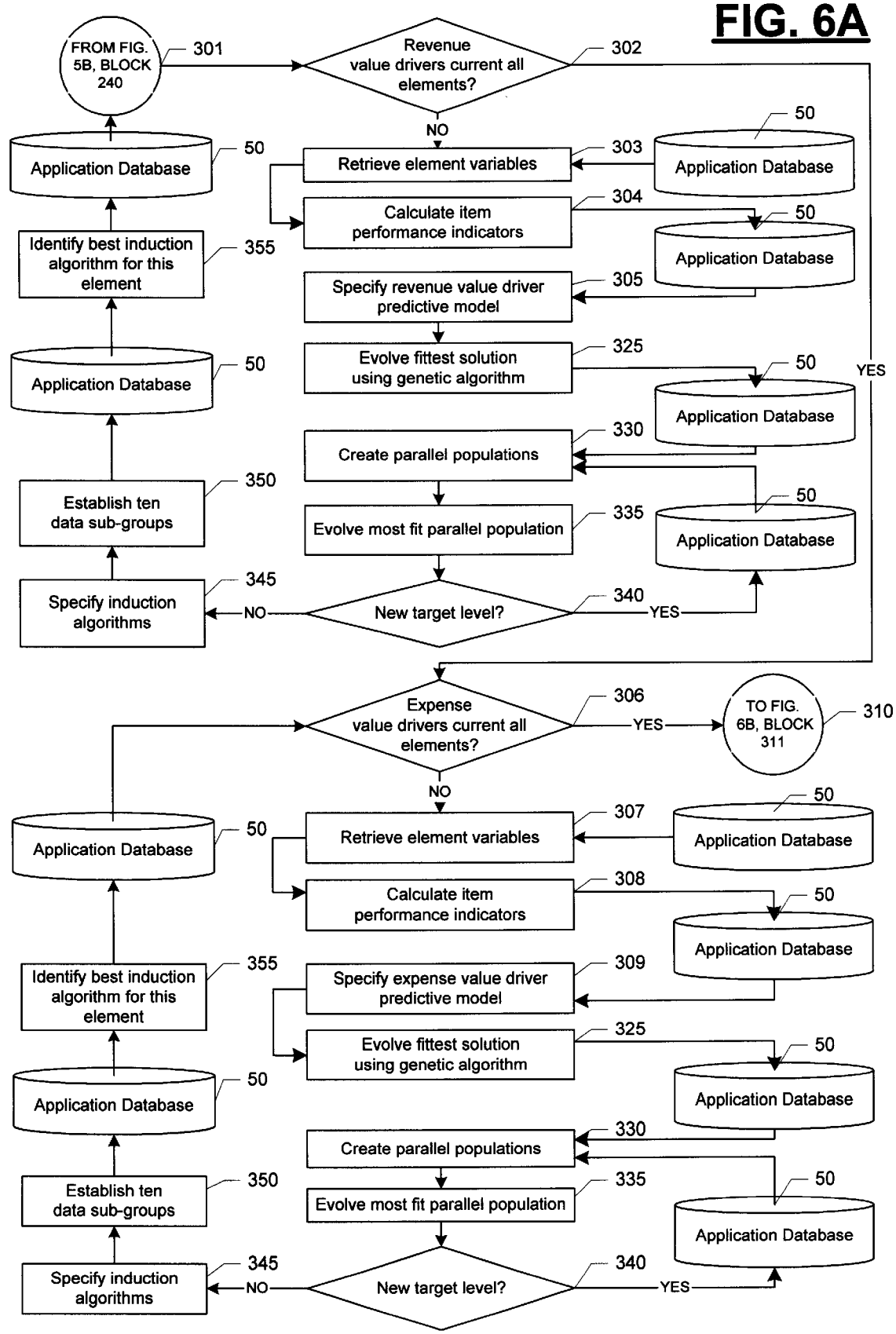
Figure 6B:
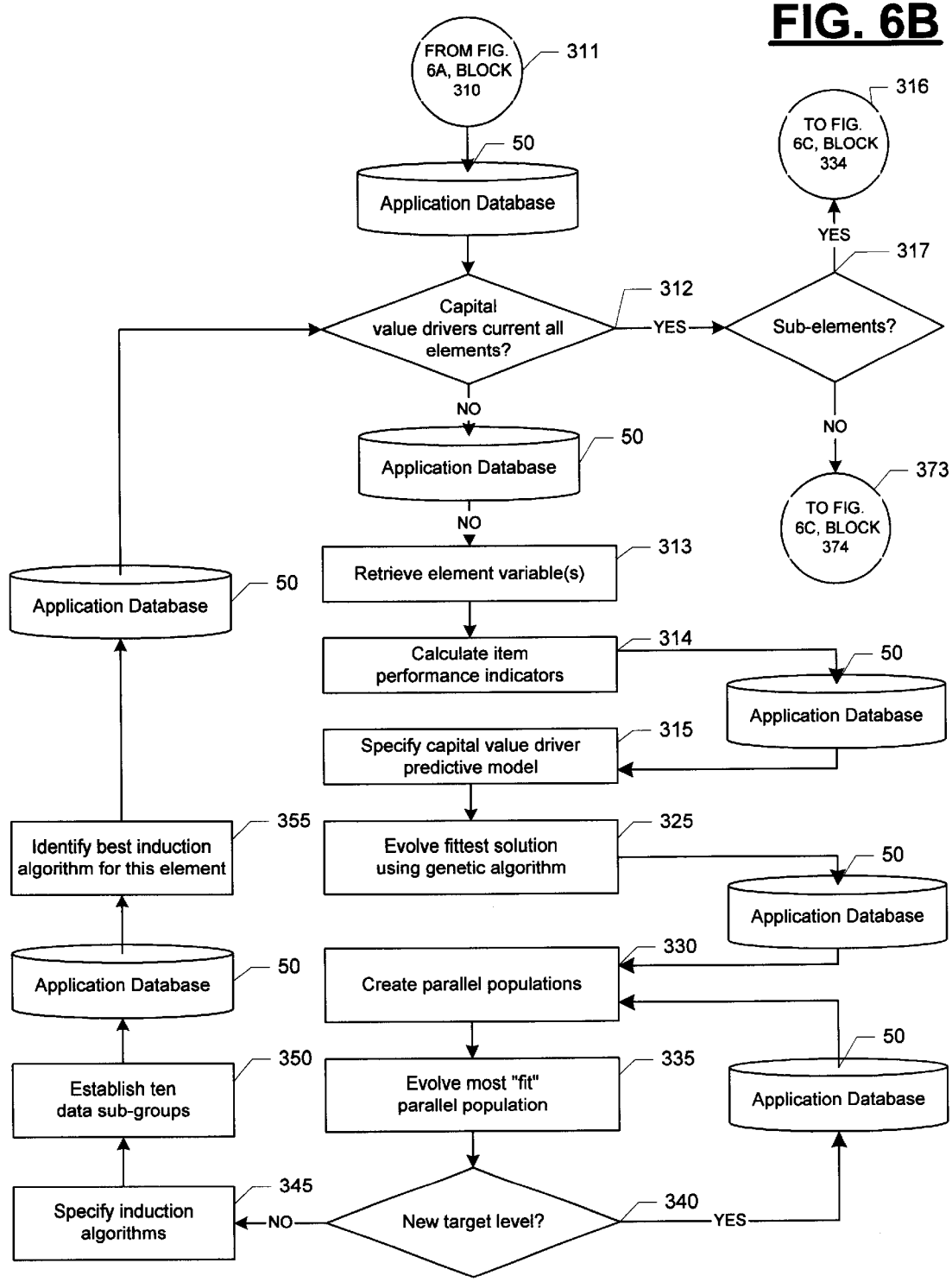
Figure 6D:
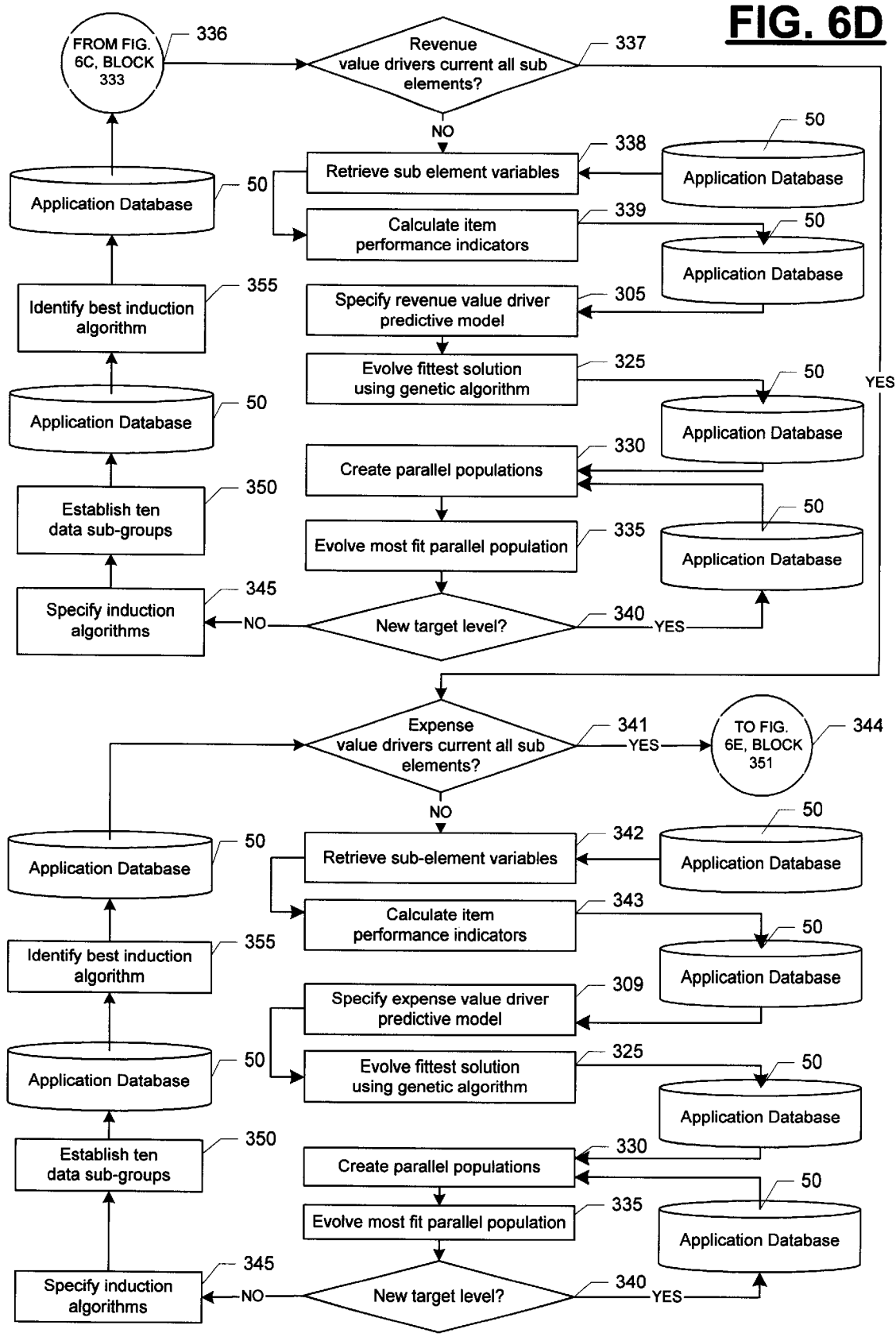
Figure 6E:
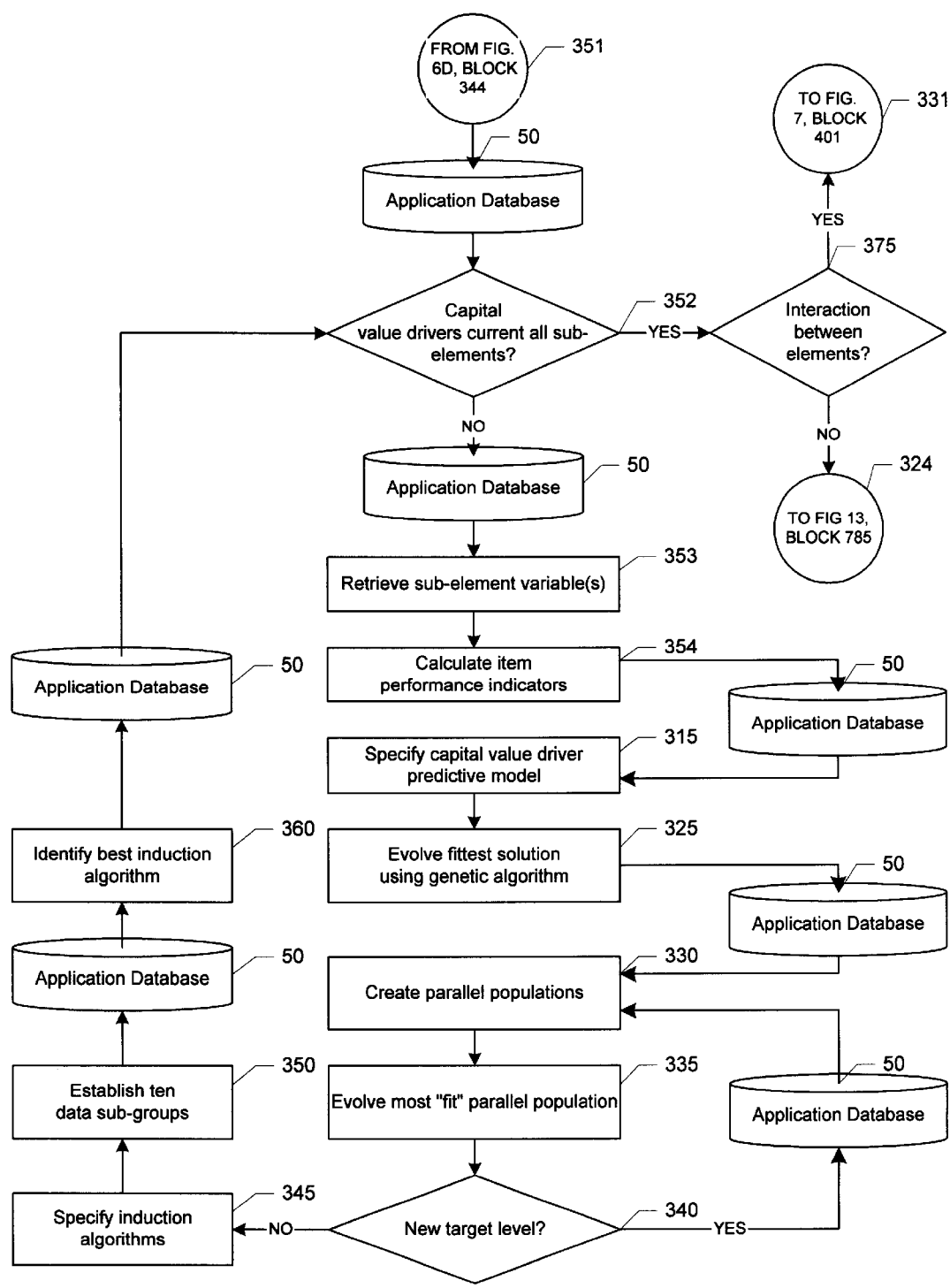
Figure 8:
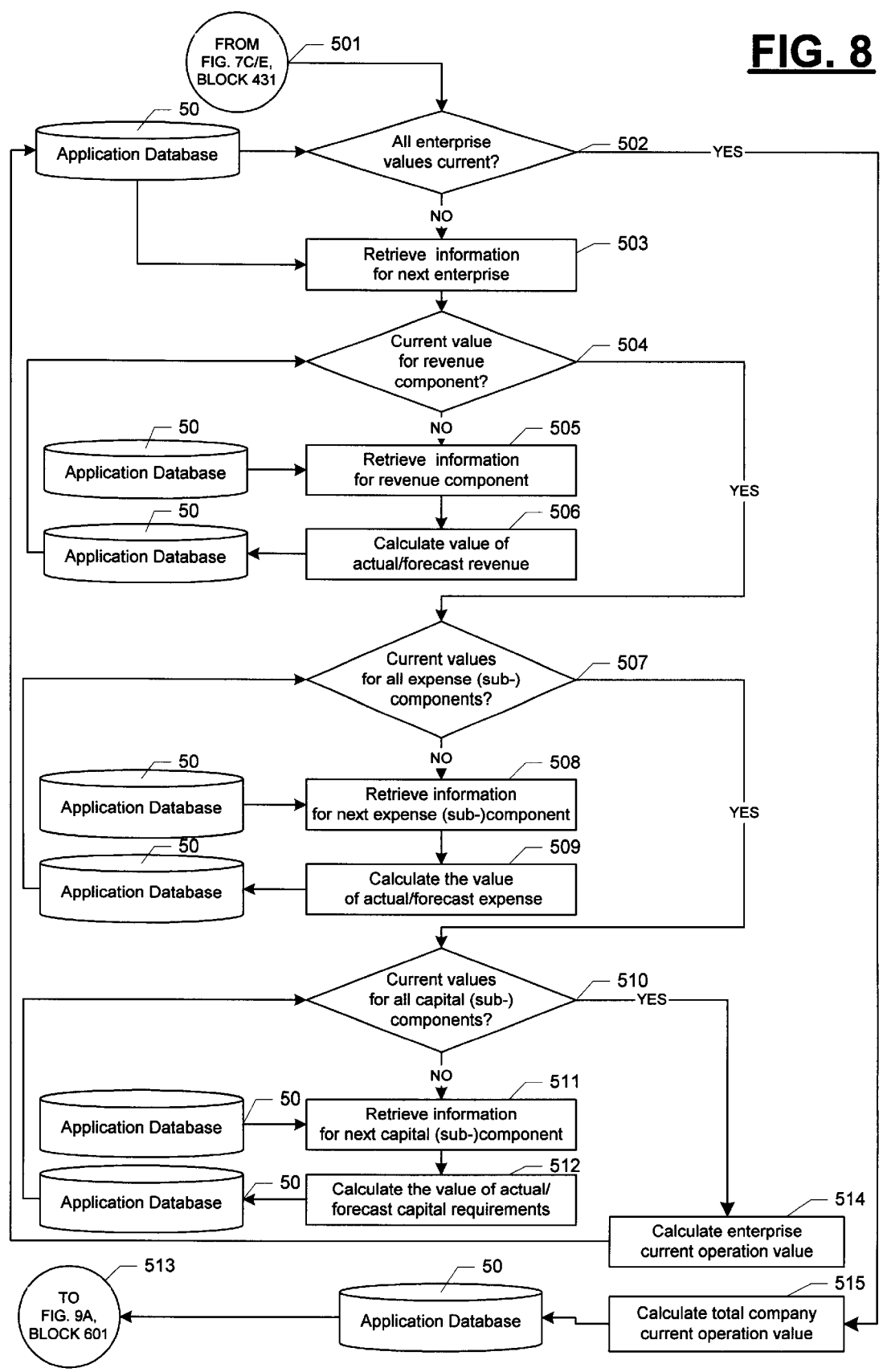
FIG. 8 is a block diagram showing the sequence of steps associated with the analyzing the components of enterprise value.
Figure 9A:
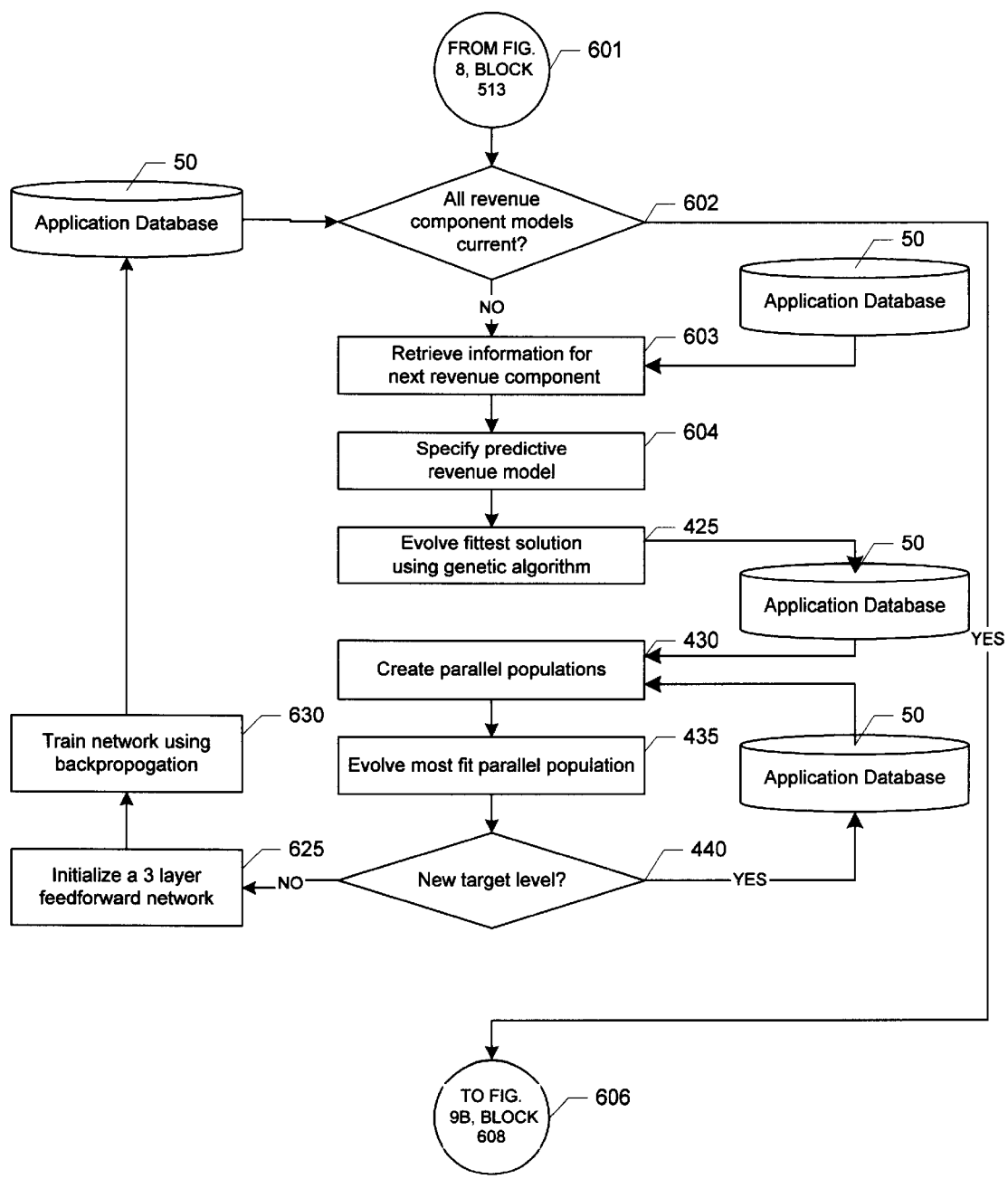
FIG. 9A, FIG. 9B and FIG. 9C are block diagrams showing the sequence of steps in the present invention that are utilized in the specification and optimization of the predictive models that determine the relationships between value drivers and the revenue, expense and capital components of enterprise value.
Figure 9B:
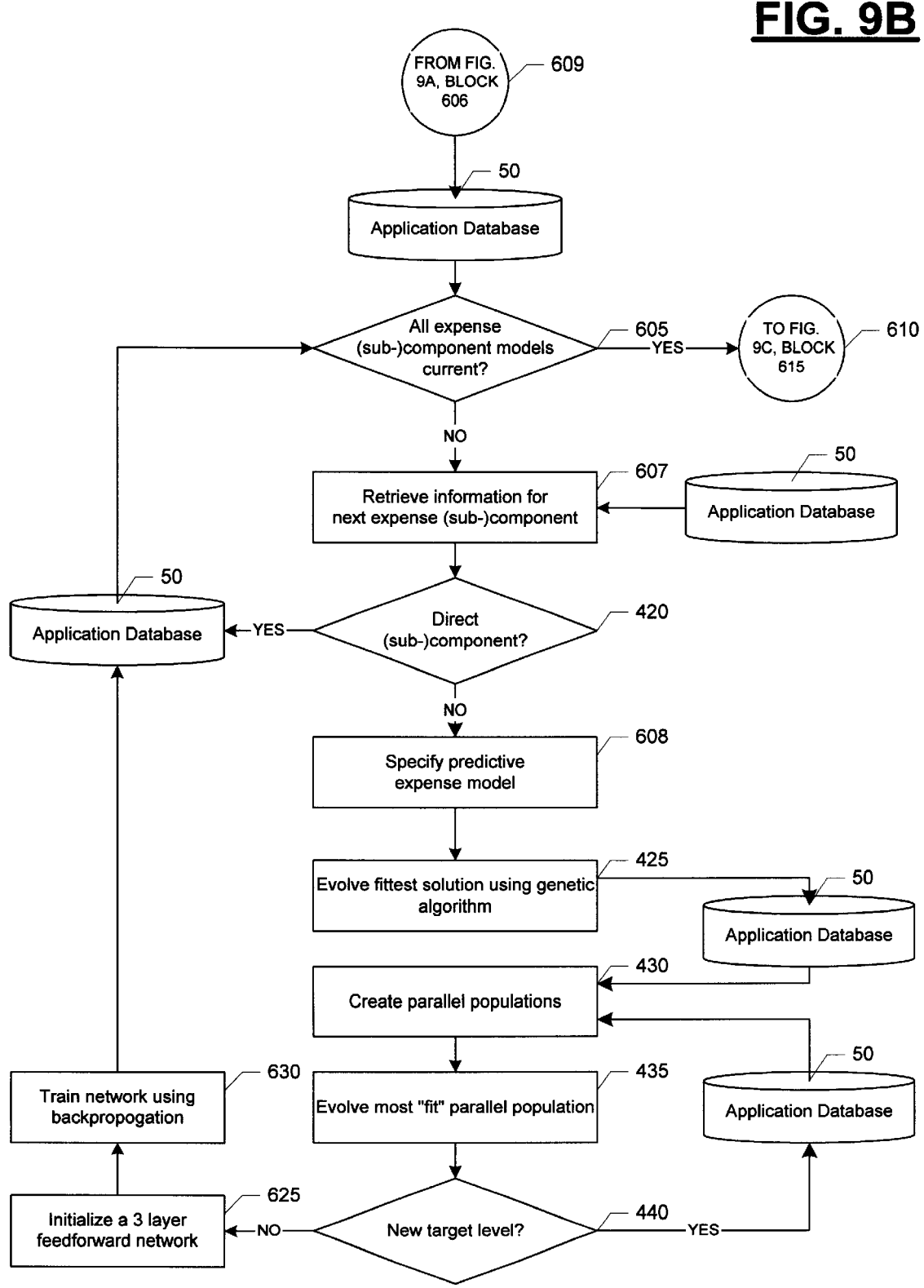
Figure 9C:
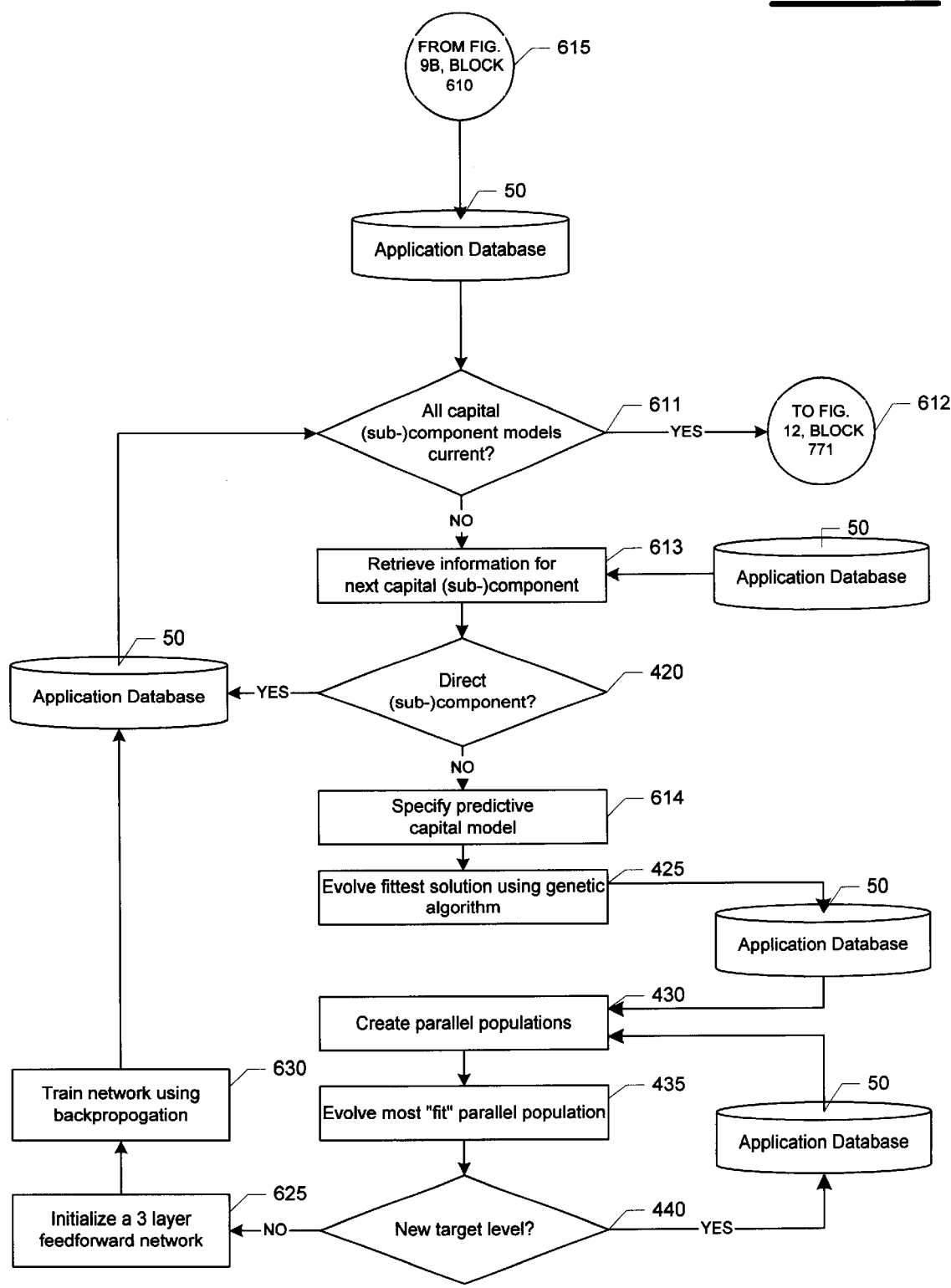
Figure 11:
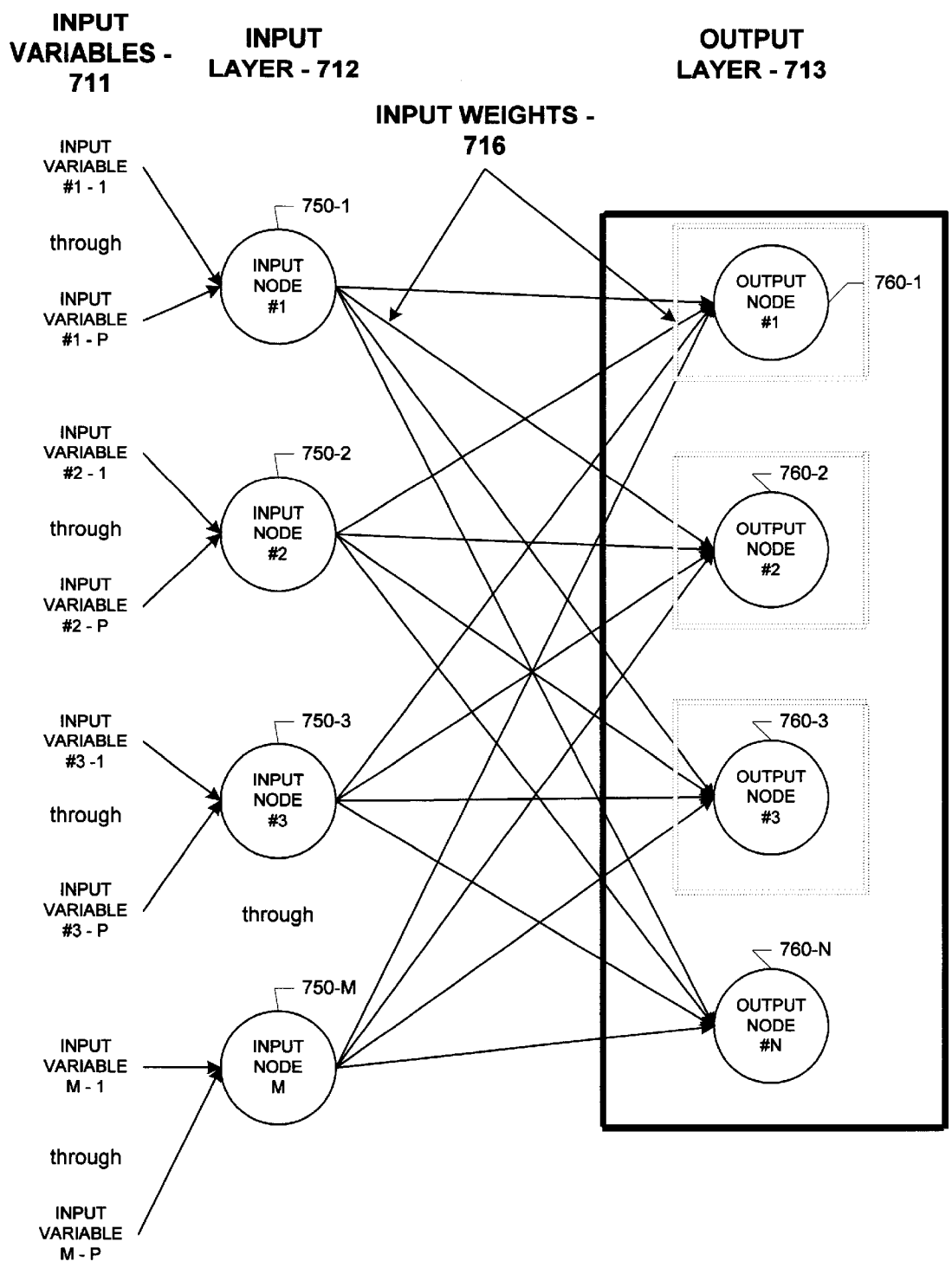
FIG. 11 is a diagram illustrating the processing of a Kohonen neural network.
Figure 12:
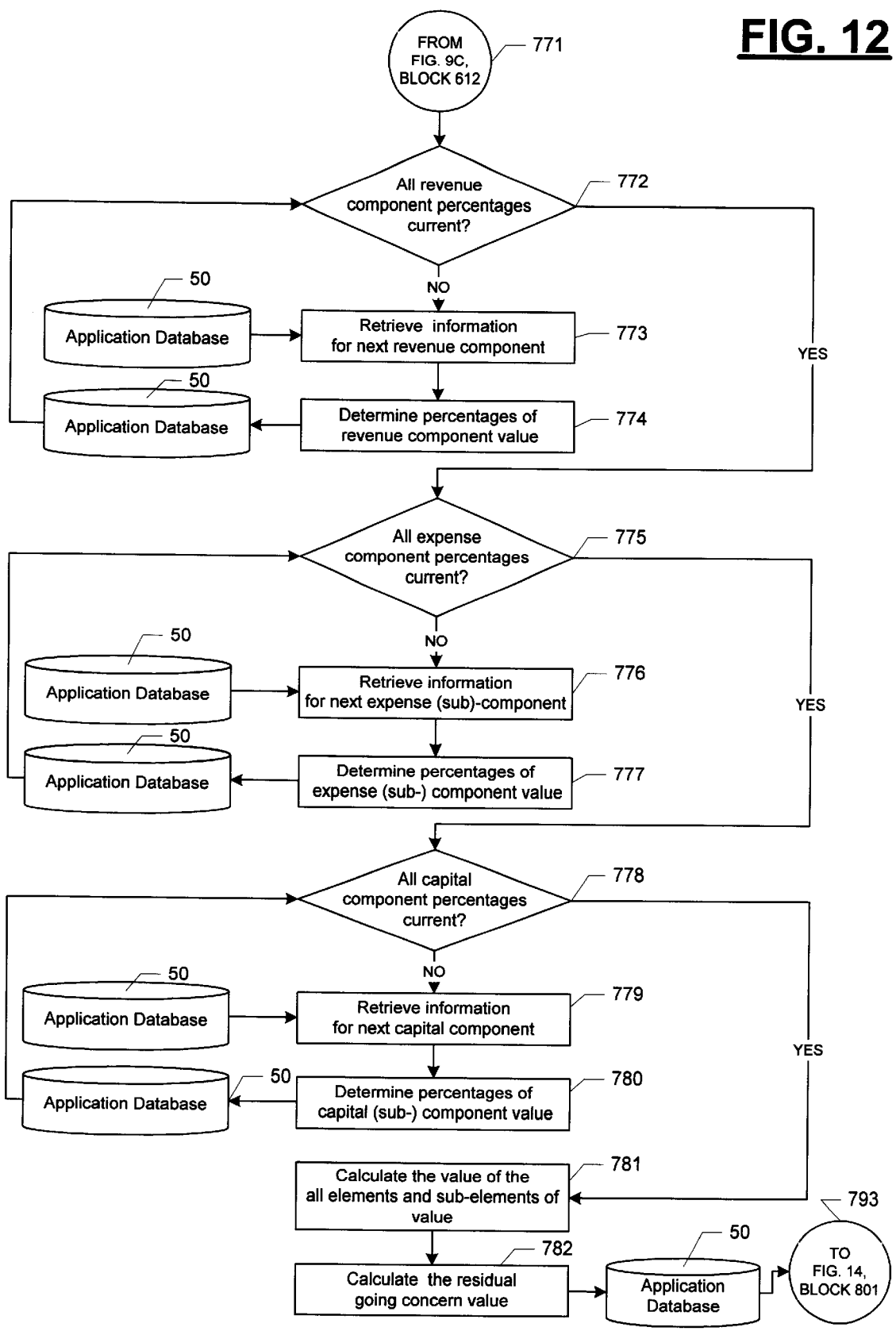
FIG. 12 is a block diagram showing the sequence of the steps in the present invention used for calculating the percentage of the revenue, expense and capital components attributed to the elements and sub-elements of value.
Figure 13:
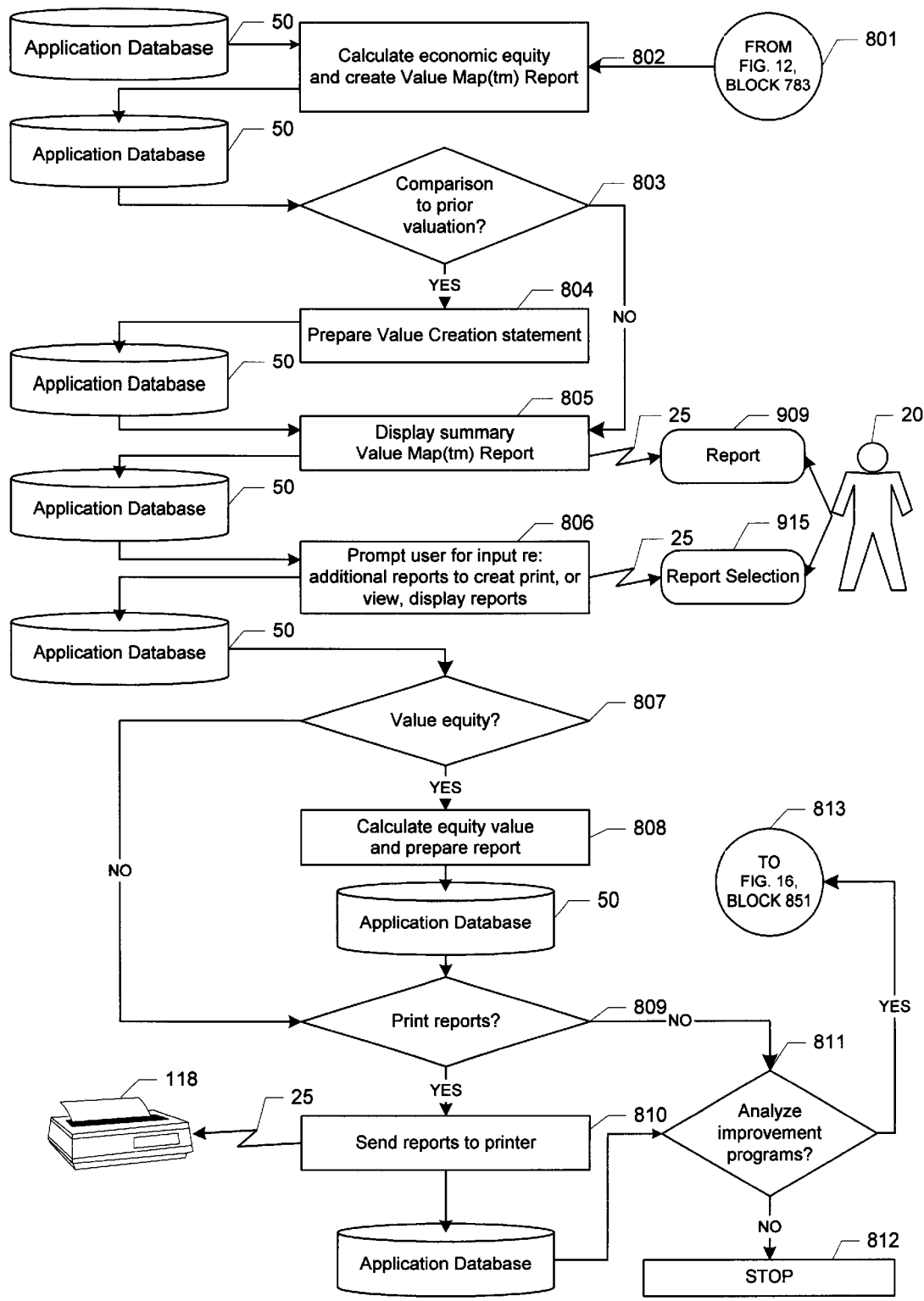
FIG. 13 is a block diagram showing the sequence of steps in the present invention used in preparing, displaying and optionally printing reports.
Figure 16:
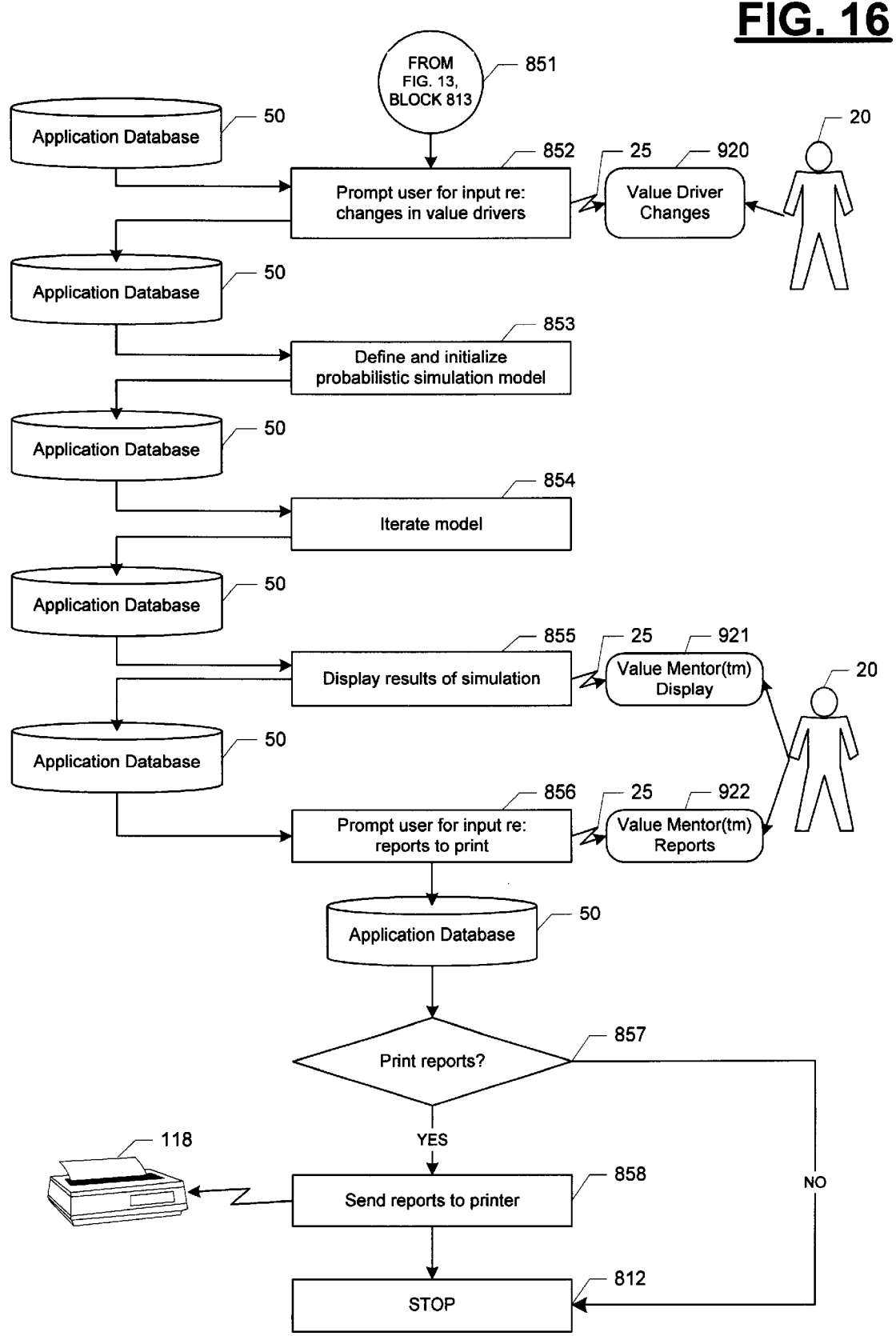
FIG. 16 is a block diagram showing the sequence of steps in the present invention used in calculating, displaying and optionally printing simulations of the effects of user-specified or system generated changes in business value drivers on the other value drivers, the financial performance and the future value of a commercial enterprise.

The valuation of an enterprise using the approach outlined above is completed in seven distinct stages. The first stage of processing (block 200 from FIG. 1) extracts, aggregates and stores the data from user input, existing internal databases (10, 15, 30, 35 or 40) and external databases (5) required for the calculation of enterprise business value as shown in FIG. 5A and FIG. 5B. The second stage of processing (block 300 from FIG. 1) identifies the item variables and item performance indicators that drive the components of value (revenue, expense and changes in capital) and calculates composite variables that characterize the performance of the elements of value, as shown in FIG. 6A FIG. 6B, FIG. 6C, FIG. 6D, FIG. 6E, FIG. 10 and FIG. 11. The third stage of system processing (block 400 from FIG. 1) values the growth options by enterprise using option pricing algorithms as shown in FIG. 7. The fourth stage of system processing (block 500 from FIG. 1) values the revenue, expense and capital components and calculates the current operation value using the information prepared in the previous stage of processing as shown in FIG. 8. The fifth stage of system processing (block 600 from FIG. 1) specifies and optimizes predictive models to determine the relationship between the value drivers and the revenue, expense and capital values as shown in FIG. 9A, FIG. 9B and FIG. 10. The sixth stage of processing (block 700 from FIG. 1) combines the results of the fourth and fifth stages of processing to determine the value of each element as shown in FIG. 12. The seventh and final stage of processing (block 800 from FIG. 1) determines the relationship between equity and calculated total value as shown in FIG. 13, optionally displays the results of the prior calculations in specified formats as shown in FIG. 14 and FIG. 15 and optionally analyzes the impact of proposed improvement programs on financial performance and value creation as shown in FIG. 16.

Extraction and Aggregation of Data

The flow diagrams in FIG. 5A and FIG. 5B detail the processing that is completed by the portion of the application software (200) that extracts, aggregates and stores the information required for system operation from: the basic financial system database (10), operation management system database (15), advanced financial system database (30), sales management system database (35), human resource information system database (40), external databases found on the internet (5) and the user (20). A brief overview of the different databases will be presented before reviewing each step of processing completed by this portion (200) of the application software.

Corporate financial software systems are generally divided into two categories, basic and advanced. Advanced financial systems utilize information from the basic financial systems to perform financial analysis, financial planning and financial reporting functions. Virtually every commercial enterprise uses some type of basic financial system as they are required to use these systems to maintain books and records for income tax purposes. An increasingly large percentage of these basic financial systems are resident in microcomputer and workstation systems. Basic financial systems include general-ledger accounting systems with associated accounts receivable, accounts payable, capital asset, inventory, invoicing, payroll and purchasing sub-systems. These systems incorporate worksheets, files, tables and databases. These databases, tables and files contain information about the company operations and its related accounting transactions. As will be detailed below, these databases, tables and files are accessed by the application software of the present invention as required to extract the information required for completing a business valuation. The system is also capable of extracting the required information from a data warehouse (or datamart) when the required information has been pre-loaded into the warehouse.

General ledger accounting systems generally store only valid accounting transactions. As is well known, valid accounting transactions consist of a debit component and a credit component where the absolute value of the debit component is equal to the absolute value of the credit component. The debits and the credits are posted to the separate accounts maintained within the accounting system. Every basic accounting system has several different types of accounts. The effect that the posted debits and credits have on the different accounts depends on the account type as shown in Table 5.

TABLE 5

| Account Type: | Debit Impact: | Credit Impact: |
| --- | --- | --- |
| Asset | Increase | Decrease |
| Revenue | Decrease | Increase |
| Expense | Increase | Decrease |
| Liability | Decrease | Increase |
| Equity | Decrease | Increase |

General ledger accounting systems also require that the asset account balances equal the sum of the liability account balances and equity account balances at all times.

The general ledger system generally maintains summary, dollar only transaction histories and balances for all accounts while the associated subsystems, accounts payable, accounts receivable, inventory, invoicing, payroll and purchasing, maintain more detailed historical transaction data and balances for their respective accounts. It is common practice for each subsystem to maintain the detailed information shown in Table 6 for each transaction.

TABLE 6

| Subsystem | Detailed Information |
| --- | --- |
| Accounts Payable | Vendor, Item(s), Transaction Date, Amount Owed, Due Date, Account Number |
| Accounts Receivable | Customer, Transaction Date, Product Sold, Quantity, Price, Amount Due, Terms, Due Date, Account Number |
| Capital Asset | Asset ID, Asset Type, Date of Purchase, Purchase Price, Useful Life, Depreciation Schedule, Salvage Value |
| Inventory | Item Number, Transaction Date, Transaction Type, Transaction Qty, Location, Account Number |
| Invoicing | Customer Name, Transaction Date, Item(s) Sold, Amount Due, Due Date, Account Number |
| Payroll | Employee Name, Employee Title, Pay Frequency, Pay Rate, Account Number |
| Purchasing | Vendor, Item(s), Purchase quantity, Purchase Price(s), Due Date, Account Number |

As is well known, the output from a general ledger system includes income statements, balance sheets and cash flow statements in well defined formats which assist management in measuring the financial performance of the firm during the prior periods when data input have been completed.

Advanced financial systems, including financial planning systems, generally use the same format used by basic financial systems in forecasting income statements, balance sheets and cash flow statements for future periods. Management uses the output from financial planning systems to highlight future financial difficulties with a lead time sufficient to permit effective corrective action and to identify problems in company operations that may be reducing the profitability of the business below desired levels. These systems are most often developed by individuals within companies using 2 and 3 dimensional spreadsheets such as Lotus 1-2-3 ®, Microsoft Excel® and Quattro Pro®. In some cases, financial planning systems are built within an executive information system (EIS) or decision support system (DSS). For the preferred embodiment of the present invention, the advanced financial system database is the financial planning system database detailed in U.S. Pat. No. 5,165,109 for "Method of and System for Generating Feasible, Profit Maximizing Requisition Sets", by Jeff S. Eder, the disclosure of which is incorporated herein by reference.

While advanced financial systems are similar between firms, operation management systems vary widely depending on the type of company they are supporting. These systems typically have the ability to not only track historical transactions but to forecast future performance. For manufacturing firms, operation management systems such as Enterprise Requirements Planning Systems (ERP), Material Requirement Planning Systems (MRP), Purchasing Systems, Scheduling Systems and Quality Control Systems are used to monitor, coordinate, track and plan the transformation of materials and labor into products. These systems will generally track information about the performance of the different vendors that supply materials to the firm including the information shown in Table 7.

TABLE 7

Operation Management System Vendor Information

1. Vendor Name
2. Vendor Number
3. Commodity Code(s)
4. Year to date dollar volume
5. Historical dollar volume
6. Percentage of deliveries rejected by QC
7. Percentage of deliveries accepted out of specification
8. Compliance with ISO 9000
9. Actual lead time required for purchases
10. Terms and conditions for purchases
11. Average Delivery Quantity Variance
12. Average Delivery Date Variance
13. EDI* vendor - Yes or No

*EDI = Electronic Data Interchange

Systems similar to the one described above may also be useful for distributors to use in monitoring the flow of products from a manufacturer.

Operation Management Systems in manufacturing firms may also monitor information relating to the production rates and the performance of individual production workers, production lines, work centers, production teams and pieces of production equipment including the information shown in Table 8.

TABLE 8

Operation Management System - Production Information

1. ID number (employee id/machine id)
2. Actual hours - last batch
3. Standard hours - last batch
4. Actual hours - year to date
5. Actual/Standard hours - year to date %
6. Actual setup time - last batch
7. Standard setup time - last batch
8. Actual setup hours - year to date
9. Actual/Standard setup hrs - yr to date %
10. Cumulative training time
11. Job(s) certifications
12. Actual scrap - last batch
13. Scrap allowance - last batch
14. Actual scrap/allowance - year to date
15. Rework time/unit last batch TABLE 8-continued Operation Management System - Production Information 16. Rework time/unit year to date
17. QC rejection rate - batch
18. QC rejection rate - year to date Operation management systems are also useful for tracking requests for service to repair equipment in the field or in a centralized repair facility. Such systems generally store information similar to that shown below in Table 9.

TABLE 9

Operation Management System - Service Call Information

1. Customer name
2. Customer number
3. Contract number
4. Service call number
5. Time call received
6. Product(s) being fixed
7. Serial number of equipment
8. Name of person placing call
9. Name of person accepting call
10. Promised response time
11. Promised type of response
12. Time person dispatched to call
13. Name of person handling call
14. Time of arrival on site
15. Time of repair completion
16. Actual response time
17. Part(s) replaced
18. Part(s) repaired
19. 2nd call required
20. 2nd call number Sales management systems are similar to operation management systems in that they vary considerably depending on the type of firm they are supporting and they generally have the ability to forecast future events as well as track historical occurrences. In firms that sell customized products, the sales management system is generally integrated with an estimating system that tracks the flow of estimates into quotations, orders and eventually bills of lading and invoices. In other firms that sell more standardized products, sales management systems generally are used to track the sales process from lead generation to lead qualification to sales call to proposal to acceptance (or rejection) and delivery. All sales management systems would be expected to store information similar to that shown below in Table 10.

TABLE 10

Sales Management System - Information

1. Customer/potential customer name
2. Customer number
3. Address
4. Phone number
5. Source of lead
6. Date of first purchase
7. Date of last purchase
8. Last sales call/contact
9. Sales call history
10. Sales contact history
11. Sales history: product/qty/price
12. Quotations: product/qty/price
13. Custom product percentage TABLE 10-continued Sales Management System - Information 14. Payment history
15. Current A/R balance
16. Average days to pay Computer based human resource systems are increasingly used for storing and maintaining corporate records concerning active employees in sales, operations and the other functional specialties that exist within a modern corporation. Storing records in a centralized system facilitates timely, accurate reporting of overall manpower statistics to the corporate management groups and the various government agencies that require periodic updates. In some cases human resource systems include the company payroll system as a subsystem. In the preferred embodiment of the present invention, the payroll system is part of the basic financial system. These systems can also be used for detailed planning regarding future manpower requirements. Human resource systems typically incorporate worksheets, files, tables and databases that contain information about the current and future employees. As will be detailed below, these databases, tables and files are accessed by the application software of the present invention as required to extract the information required for completing a business valuation. It is common practice for human resource systems to store the information shown in Table 11 for each employee.

TABLE 11

Human Resource System Information

1. Employee name
2. Job title
3. Job code
4. Rating
5. Division
6. Department
7. Employee No./(Social Security Number)
8. Year to date - hours paid
9. Year to date - hours worked
10. Employee start date - company
11. Employee Start date - department
12. Employee start date - current job
13. Training courses completed
14. Cumulative training expenditures
15. Salary history
16. Current salary
17. Educational background
18. Current supervisor External databases such as those found on the internet (5) can be used for obtaining information that enables the categorization and valuation of assets such as brand names, trademarks and service marks (hereinafter, referred to as brand names). In some cases it can also be used to supplement information obtained from the other databases (10, 15, 30, 35 and 40) that are used in categorizing and evaluating employee groups and other elements of value. In the system of the present invention, the retrieval of information from the internet (5) can be:

a) targeted to specific on-line publications that provide information relevant to the element being evaluated, b) restricted to a simple count of the number of matches a specific trademark generates when entered into a general purpose internet search-engine such as Yahoo!, Lycos, AltaVista or HotBot, or WebCrawler, and c) specific searches using commercially available software agents and/or text mining products to determine both the number and the type of references (favorable, unfavorable or information only) that have been made concerning a specific trademark in all discovered references.

System processing of the information from the different databases (5, 10, 15, 30, 35 and 40) described above starts in a block 201, FIG. 5A, which immediately passes processing to a software block 202. The software in block 202 prompts the user via the system settings data window (901) to provide system setting information. The system setting information entered by the user (20) is transmitted via the interconnection network (25) back to the application server (120) where it is stored in the system settings table (140) in the application database (50) in a manner that is well known. The specific inputs the user (20) is asked to provide at this point in processing are shown in Table 12.

TABLE 12

System Settings

1. Mode of operation - stand-alone valuation or comparison to previous valuation
2. Date of business valuation calculation (valuation date)
3. Date of previous valuation (if any)
4. Location (address) of basic financial system data dictionary and data
5. Location (address) of advanced financial system data dictionary and data
6. Location (address) of human resource information system data dictionary and data
7. Location (address) of operation management system data dictionary and data
8. Location address of sales management system data dictionary and data
9. Location address of any external databases used in the valuation calculation
10. The maximum acceptable age of a valuation (in days)
11. The maximum number of generations to be processed without improving fitness
12. Base currency
13. Currency conversions for any non-base currencies used in the financial systems
14. Weighted average cost of capital (to be used in discounting cash flows)
15. Simplified analysis (no sub-components of expense or capital value)
16. Number of months a product is considered new after it is first produced
17. Define composite variables? (Yes or No)
18. Amount of cash and marketable securities required for day to day operations The application of these system settings will be explained as part of the detailed explanation of the system operation.

The software in block 202 uses the valuation date specified by the user (20) to determine the time periods (months) that require data in order to complete the valuation of the current operation and the growth options and stores the resulting date range in the system settings table (140). The valuation of the current operation by the system requires sales, operation, finance, external database and human resource data for the three year period before and the four year period after the specified valuation date. Because of the difficulties inherent in forecasting from the perspective of the past or the future, the specified valuation date is generally within a month of the current system date. After the storage of system setting data is complete, processing advances to a software block 203 where the data dictionaries from the basic financial system database (10), the operation management system database (15), the advanced financial system database (30), the sales management system database (35) and the human resource information system database (40) are extracted and saved in the data dictionary table (149) in the application database (50) and processing advances to a software block 204.

The software in block 204 checks the system settings table (140) in the application database (50) to determine if the current calculation is a comparison to a prior valuation or if it is a stand-alone calculation. If the calculation involves a comparison with a prior valuation, then the software in block 204 retrieves the previously defined account structure, data definitions, enterprise definitions and component definitions and saves them in the appropriate tables for use in the current calculation before processing advances to a software block 209. Alternatively, if the calculation is a stand-alone, then processing advances to a software block 205.

The software in block 205 interacts with an account structure and data dictionary data window (902) that prompts the user for any input that is required to define data fields for the extracted data dictionaries and the data dictionary of the application software of the present invention. This input is also saved to the data dictionary table (149). The software in block 205 also prompts the user (20) via the account structure and data dictionary data window (902) for information that edits or defines the account structure used in the financial system databases. It is common practice for account numbers to have several segments where each segment represents a different set of subgroups as shown below in Table 13.

TABLE 13

| Account Number | 01- | 800- | 901- | 677- | 003 |
| --- | --- | --- | --- | --- | --- |
| Segment | Company | Division | Department | Account | Sub-account |
| Subgroup Position | Products 5 | Workstation 4 | Marketing 3 | Labor 2 | P.R. 1 |

As will be detailed below, the different account number segments are used for separating the financial information for analysis.

After the account structure information is stored in the account number structure table (147) in the application database (50), processing advances to a block 206 where the software in the block interacts with an enterprise definition data window (903) to prompt the user (20) to specify the account number segment or segments that will be used to define the enterprise being valued by the innovative system of the present invention. For example, the user (20) could specify that each division is to be analyzed as a separate enterprise. In this case, if the total company had two business units with six divisions, then, the user could specify up to six enterprises as shown in Table 14.

TABLE 14

| Products Business Unit | Software Business Unit |
| --- | --- |
| 1. PC Division | 5. Application Software Division |
| 2. Workstation Division | 6. Operating System Software Division |
| 3. Mainframe Division | |
| 4. Peripherals Division | |

The specified enterprises are then displayed to the user (20) by the software in block 206 via the enterprise definition data window (903). At this point, the user (20) is given the option of combining the enterprises or leaving them in the initial configuration. For example, the user (20) could combine the Personal Computer Product enterprise and the Workstation Product enterprise into one enterprise for the business valuation calculation. When the user (20) indicates that all enterprises have been defined, the resulting specifications are stored in the enterprise definition table (155) in the application database (50).

After the enterprise definitions are stored, processing advances to a software block 207 where the software in the block prompts the user (20) via a component definition data window (904) to specify the account segment or segments that will be used to define the expense and capital sub-components for each enterprise. Only account segments with position numbers below those of the segment used for enterprise specification can be used for expense and capital sub-component specification. Continuing the example shown above for a valuation calculation, departments, accounts and sub-accounts are the only segments that can be utilized for expense or capital component and sub-component specification. This limitation is applicable because their position numbers 3, 2 and 1 respectively are below 4, the position number of the division segment that was the lowest position used to define the enterprise. As discussed previously, there is only one revenue component per enterprise; therefore, the enterprise definition automatically defines the revenue component.

For the normal analysis, each enterprise has: one revenue component, five expense sub-components (cost of raw materials, the cost of manufacture or delivery of service, the cost of sales, the cost of support and other costs), four capital sub-components used in the valuation calculation (cash, non-cash financial assets, other (non-financial, non-production) assets, liabilities), and two capital sub-components that are not used directly in the valuation calculation (production equipment and equity). The software in block 207 via the component definition data window (904) will accept all logical combinations of account number segment specifications for a sub-component while preventing the reuse of the same segment for more than one sub-component specification in each enterprise. Sub-component definitions are required even if the user (20) has chosen to run a simplified analysis (i.e., one without sub-components). The user (20) is also given the option at this time of designating some or all of the expense and capital sub-components as direct sub-components that can be evaluated using output from an activity based costing system or some other system without use of the predictive models. Table 15 provides examples of expense and capital sub-component definitions.

TABLE 15

| Sub-component | Definition |
| --- | --- |
| Expense: Cost of materials | Departments 10–15, accounts 500 to 505 |
| Expense: Cost of manufacturing | Departments 10–18, accounts 506 to 999 |
| Expense: Cost of sales | Department 21, accounts 500 to 999 |
| Capital: Cash | Account 100, all departments |
| Capital: Liabilities | Accounts 200–299, all departments |

The software in block 207 saves the new or updated revenue component definitions to the revenue component definition table (150), expense sub-component definitions to the expense component definition table (151) and capital sub-component definitions to the capital component definition table (152). The production equipment and other asset definitions are also used to populate the physical asset ID table (145) and the asset liquidation price table (146) with the names of all assets used by all enterprises.

After the definitions for the revenue, expense and capital components have been stored in the application database (50), processing advances to a software block 209. Processing can also advance to block 209 directly from block 204 if the calculation is a comparison to a prior valuation. The software in block 209 checks to determine if all the available financial data have been included in a revenue, expense, or capital component or sub-component. In the example shown above, block 209 would check to determine that the financial data for all divisions, departments, account numbers and sub-account numbers have been assigned to a component. If the software in block 209 determines that all financial data have been assigned to a component, then processing advances to a software block 210. Alternatively, if the software in block 209 determines that some financial data have not been assigned to a component, then processing advances to a software block 208. The software in block 208 prompts an edit component definition data window (905) to display a screen that provides the user (20) with the ability to redefine previously stored component and sub-component definitions to include the unassigned financial data. The revised component definition(s) are then saved in the appropriate definition table(s) (150, 151 or 152) in the application database (50) and processing returns to block 209 and from there to software block 210.

The software in block 210 retrieves the debit or credit balances from the basic financial system database (10) and the advanced financial system database (30) in account segment position order, lowest position to highest position, for the revenue, expense and capital components for the time periods determined by the software in block 202 and stored in the system settings table (140). Continuing the example, the software in block 210 would first retrieve and total debits and credits in each required period for the sub-components that have sub-account specifications. The higher level specifications, account number, department and division, are observed when data are retrieved for the sub-components with sub-account specifications. The software in block 210 would then retrieve the required data for the sub-components with account number specifications. The higher level specifications, department and division, are observed when data are retrieved for the sub-components with account number specifications. The software in block 210 would finally retrieve the required data for the sub-components with department number specifications. The higher level specification, division, is observed when data are retrieved for these sub-components. This same procedure is completed for each enterprise and the resulting totals are then saved in the appropriate data tables (141-revenue, 142-expense and 143-capital) in the application database (50).

After all the financial data have been extracted and stored in the application database (50), system processing advances to a software block 212. The software in block 212 determines if any of the components or sub-components are missing data for any of the required periods. Missing data is defined as the condition when there is a null value for a sub-component financial data field in a required period. If the software in block 212 determines that all components have the required data in all periods, then processing advances directly to a software block 221. Alternatively, if data are missing, then processing advances to a software block 213 where the user (20) is prompted by a missing financial data window (906) to provide the missing data or the location of the missing data. In some cases the user (20) may simply replace the null value with a zero. After the user (20) provides the missing data or the location of the missing data, the appropriate data tables (141-revenue, 142-expense and/or 143-capital) in the application database (50) are updated and processing advances to software block 221.

The next step in system processing is completed by software block 221 where the software in the block prompts the user (20) via an element of value specification data window (907) to define the elements of value for each enterprise, to indicate the maximum number of sub-elements for each element and to identify the identity and location of transaction data and other information that are related to each element of value. Elements of value with sample specifications are shown below in Table 16.

TABLE 16

| Element of Value: Name/ Definition | Maximum Sub Elements | Element of Value Data Identity and Location |
|---|---|---|
| Customers/ Customer numbers 1–21,877 | 10 | Account payment data (10); Communications. history (15), Date of first order (35); Order history line items, products/services, revenue, returns, delivery (10 & 35); Invoice adjustment history (10 & 35), Service call history - first time and repeat (15); Technical support call history - first time and repeat (15). |
| Employees Production/ Job codes: 17, 18, 19 and 33 | 0 | Date of first employment (40), Employee suggestion history (15); Employee training data (40); Employee production data - hours, piece quantity (15); Employee pay data including benefits (10, 30 & 40). |
| Brand names/ Name(s) | 50* | Monthly average price premium/(discount) vs. industry average price (35), Monthly number of favorable mentions in trade press (5), Monthly number of hits on corporate web site (5), Monthly spending on advertising (10), Monthly average cost per 1,000 for advertising (10). |

*Default system limit

The information entered by the user (20) defining the elements of value is stored in the element of value definition table (153), the location of the element of value data is stored in the composite variable location table (167), and an index of the element of value data is stored in the composite variable data table (168) in the application database (50), before processing advances to a software block 222.

The software in block 222 prompts the user (20) via a growth option definition data window (908) to specify the growth options that will be valued for each enterprise. The specification of each growth option includes: an option name; the financial resources consumed or generated by the growth option by component of value; the resources associated with the growth option by element of value, and the number of scenarios that will be analyzed as part of the growth option valuation. A growth option specification example is shown below in Table 17.

TABLE 17

Growth Option Example Specification

| Option name | VRML Equipment |
|---|---|
| Revenue Component | None |
| Expense Sub-Component: Raw Materials | Department 17, accounts 500 to 505, after 6/97 |
| Expense Sub-Component: Other | All expenses, department 87 |
| Capital Sub-Component: Other Assets | All assets, department 87 |
| Element of Value: Other Employees | All employees, department 87 |

If the system (100) is calculating a business valuation comparison, then the input from the user (20) regarding growth options is limited to defining new growth options.

After the user's input is stored in the growth option definition table (175) in the application database (50), processing advances to a software block 223. The software in block 223 retrieves data from the different databases in accordance with the specifications provided by the user(20) in the previous two steps. After this information is stored in the application database (50) processing advances to a software block 225.

The software in block 225 prompts the user (20) via a tax information data window (910) to provide an overall tax rate for the company and detailed schedules for federal income taxes plus any other taxes as shown in Table 18.

TABLE 18

| Tax | Example Schedule |
|---|---|
| Federal Income Tax | 15% of first $250,000 in profit 25% of next $500,000 in profit 35% of profit over $750,000 |
| State Tax | 2.25% of revenue |
| Overall Tax Rate | 33% of GAAP operating profit |

After the information the user (20) provides is stored in the tax data table (173) in the application database (50), processing advances to a software block 226. The software in block 226 prompts the user (20) via an equity information data window (911) to provide historical and forecast (Fcst) information for each account included in the equity sub-component specification stored in the capital component definition table (152) as shown in Table 19.

TABLE 19

| Equity Account | Example Schedule | Actual /Fcst |
|---|---|---|
| 301 - Preferred stock | 100,000 shares @ $40/share 9/1/87 with yield 5% | A |
|  | 250,000 shares @ $90/share 3/31/98 with yield 2% | F |
| 302 - Common Stock | 1,000,000 shares @ $20/share on valuation date | A |
|  | Price history for last 5 years | A |
| 303 - Dividends | Actual dividends last 5 years | A |

After the information the user (20) provides is stored in the equity data table (144) in the application database (50), processing advances to a software block 227.

The software in block 227 prompts the user (20) via a liability information data window (912) to provide historical and forecast information concerning each account included in the financial liability sub-component stored in the capital component definition table (152) as shown in Table 20.

TABLE 20

| Liability Account | Example Schedule | Actual /Fcst |
|---|---|---|
| 201 - Accounts Payable | NA |  |
| 203 - Accrued Salary | NA |  |
| 205 - Short Term Debt | $150,000 @ 12% annual, 12/31/91 | A |
|  | $250,000 @ 11.7% annual, 3/17/93 | A |
|  | $250,000 @ 11% annual, 6/30/99 | F |
| 215 - Long Term Debt | $2,500,000 @ 8.5% annual, 9/1/93 | A |

After the information the user (20) provides is stored in the debt data table (174) in the application database (50), processing advances to a software block 228.

The software in block 228 calculates the current weighted average cost of capital using the information stored in the debt and equity tables (174 and 144, respectively) using Formula 1 shown below.
Formula 1

$$\text{Weighted average cost of capital} = ((D/V) \times R_D)(1-T) + (E/V \times R_E)$$

Where:
D=Value of Debt, E=Value of Equity, $R_D$=Weighted Average Interest Rate of Debt, T=Tax Rate, $R_E$=Rate of Return on Equity (based on historical information provided) and V=(D+E)

After the calculation is completed, processing advances to a software block 229. The software in block 229 compares the calculated value to the value previously specified by the user (20) in the system settings table (140). If the two values are different, then processing advances to a software block 230 which prompts the user via a cost of capital selection data window (913) to select the cost of capital figure to use for future calculations. The cost of capital specified by the user (20) is stored in the system settings table (140) and processing returns to block 229 and on to a software block 232. System processing passes directly to block 232 if the calculated and specified values of the cost of capital are identical.

The software in block 232 checks the asset liquidation price table (146) to determine if there are "current" (as defined previously) liquidation prices for all physical assets listed in the physical asset ID table (145). If there are "current" prices for all physical assets listed in the physical asset ID table (145), then processing advances to a software block 302 where the identification of the value drivers begins. If, on the other hand, there are not "current" prices for all physical assets, then processing advances to a software block 235. The software in block 235 prompts the user (20) via a liquidation price entry data window (914) to provide liquidation prices for all physical assets that don't have "current" values. The user (20) is given the option of specifying a liquidation value as a fixed price, as a percentage of original purchase price or as a percentage of book value (as stored in the basic financial system database (10)). After the required information has been entered by the user (20) and stored in the asset liquidation price table (146) in the application database (50), system processing advances to a software block 302.

Identify Value Drivers by Element

The flow diagrams in FIG. 6A, FIG. 6B, FIG. 6C, FIG. 6D and FIG. 6E detail the processing that is completed by the portion of the application software (300) that identifies the item variables and item performance indicators that drive revenue, expense and changes in capital by element for all defined enterprises. The item variables and item performance indicators identified during this processing are collectively referred to as "value drivers".

Processing begins in software block 302. The software in block 302 checks the composite variable table (156) and the revenue driver table (179) in the application database (50) to determine if all enterprise revenue components have "current" drivers and composite variables for all elements. If all enterprise revenue components have "current" drivers for all elements, then processing advances to a software block 306. Alternatively, if there are any revenue components without "current" drivers for at least one element, then processing advances to a software block 303. The software in block 303 uses the element of value definition table (153) and excluded variables table (182) to guide the retrieval of information required to specify the next revenue driver model that is being updated. All information related to the enterprise element being examined less any information identified in the excluded variable table (182) is retrieved by block 303 from the primary databases including: the basic financial system database (10), the operation management system database (15), the advanced financial system database (30), the sales management system database (35), the human resource information system database (40), and external databases found on the internet (5) by item. For example, if the element being modeled was the customer element that was defined by the customer numbers in the range from 1 to 21,877, then all numeric and date fields in data records containing a customer number, save those listed in the excluded variable table (182), would be retrieved and stored in the revenue driver table (179) by item. The numeric and date field data are collectively referred to as "item variables". When all item variables have been stored in the revenue driver table (179), processing advances to a software block 304.

The software in block 304 calculates expressions by item for each numeric data field including: cumulative total value, the period to period rate of change in value, the rolling average value and the time lagged value of each numeric item variable. In a similar fashion the software in block 304 calculates expressions for each date field including time since last occurrence, cumulative time since first occurrence, average frequency of occurrence and the rolling average frequency of occurrence. The numbers calculated from numeric and date fields are collectively referred to as "item performance indicators". After the item performance indicators are calculated and stored in the revenue driver table (179) in the application database (50), processing advances to a software block 305.

The software in block 305 creates a predictive time series neural net model for the revenue driver. More specifically, the software in the block creates a neural network model that relates the item variables and item performance indicators for a given enterprise to the revenue component. Neural networks are increasingly being used for statistically modeling the relationships between sets of data. One of the main reasons for the increase in their use is that they are effective in modeling relationships even when there are nonlinear relationships and interactions between independent variables. Neural networks consist of a number of processing elements (hereinafter, referred to as nodes) that send data to one another via connections. The strengths of the connections between the nodes are referred to as weights. As shown in FIG. 10, there are three types of nodes, input nodes (710-x), hidden nodes (720-x) and output nodes (730). Input nodes receive data values from input variables (701). A threshold node (710-THRESH) is a special class of input node (710-x) with a constant weight of 1 on the connection to a hidden node (720-x). Hidden nodes (720-x) create intermediate representations of the relationship between input data and the output values. It is important to note that while the diagram in FIG. 10 shows only one layer of hidden nodes (703), in many cases a network model will contain several layers of hidden nodes. Finally, output nodes (730) produce output variables (705).

The action of a neural network is determined by two things: the architecture, that is how many input, hidden and output nodes it has; and the values of the weights. A neural network "learns" by modifying its weights (706 and 707) to minimize the difference between the calculated output value (705) and the actual output value. The difference between the calculated output value and the actual output value is defined as the error function for the network. For revenue components such as those specified by the software in block 305, the error function is defined by $$\text{Formula 2}$$
$$\text{ERR}(W)_k = \tfrac{1}{2}(R_k - Y(W))^2$$

Where:

| | |
|---|---|
| W | = a set of weight values |
| ERR(W)$_k$ | = error function for W for period k |
| R$_k$ | = actual/forecast revenue for period k |
| Y(W) | = output value for W |

The process for minimizing the error function will be detailed after the specification of the network architecture is explained.

The software in block 305 determines the number of the input nodes and hidden nodes for each network as a function of the number of item variables and item performance indicators specified by the software in blocks 303 and 304. There are also additional input nodes for prior period revenue and for a threshold node. For the system of the present invention, the number of hidden nodes is derived by adding one (1) to the number of input nodes. Table 21 shows the calculation of the number of nodes in an example predictive revenue model.

TABLE 21

| Potential Value Drivers - Element to Revenue Model by Item | Quantity |
|---|---|
| Item Variables | 6 |
| Item Performance Indicators | 48 |
| Subtotal Input Nodes: | 54 |
| Threshold & Prior Period Nodes | 2 |
| Total Input Nodes: | 56 |
| Hidden Node Adder | 1 |
| Total Hidden Nodes: | 57 |

The software in block 305 sets the initial number of hidden layers to one. The software in block 305 also establishes one output node for the revenue and sets all weights to random numbers between 0 and 1 (except the threshold node weight which is fixed at 1).

The processing completed by all of the network nodes (710-x, 720-x and 730) is similar. The input nodes (710-x) receive their input of item variables and item performance indicators by item by period while the hidden node (720-x) receives its input from the input nodes and the output nodes (730-x) receive their input from the hidden nodes. Each node multiplies the received input by the corresponding weight (706 or 707) to produce a weighted sum. The network applies a sigmoid or linear function to the weighted sum to determine the state of the node. The state of each node is then passed on to the next layer along a weighted connection or it is used to generate an output variable. When the network architecture including the nodes has been specified by the software in block 305, then processing advances to a software block 325 where network optimization begins.

The normal operation of a neural network requires the use of very large amounts of data to train the network to minimize the error function and then test the networks predictive capabilities. The preferred embodiment of the present invention minimizes the need for very large data sets by using genetic algorithms to find the weights (W) that reduce the error function to an acceptable level before optimizing the network using the backpropagation algorithm to determine the "best fit". The software in a block 325 uses genetic algorithms to find solutions for the current error minimization problem by evolving a set of solutions toward the desired goal of having an error function value of zero. More specifically, the genetic algorithms in block 325 create and maintain a population of the software equivalent of DNA chromosomes (hereinafter, chromosomes) that "evolve" toward the specified goal by using selective crossover and random mutation to generate new chromosomes. For this application, the chromosomes (see Table 22 below) encode the network weights.

TABLE 22

| |
|---|
| Gene 1 |
| Gene 2 |
| Gene 3 |
| Gene 4 |
| Gene 5 |

Each individual "gene" represents a weight between two sets of nodes. The fitness of each chromosome in the population is evaluated by the proximity of the resulting solution to the expected objective function maximum (the maximum of the objective function corresponds to the minimum error level of the neural network). Selective crossover in a genetic algorithm gives a preference to the chromosomes (sets of weights) that are the most fit (e.g., have lowest error and highest objective function outputs). Crossover is a form of reproduction that separates each of two individual chromosomes into two separate pieces at a random break point. Crossover is completed when the algorithm recombines the top piece from the first chromosome with the bottom piece of the second chromosome and the bottom piece from the first chromosome with the top piece from the second chromosome to produce two new chromosomes that have a mix of "genes" from each of the original chromosomes. Giving a preference to the most fit chromosomes increases the likelihood that the new chromosomes will produce more fit solutions than the precursor chromosomes. Mutation is the random change in the value of a randomly selected "gene". Mutation occurs to "genes" during crossover. It also occurs in individual chromosomes within the population. When a population of chromosomes has been crossed over and mutated, a new generation of the population is created. The fitness of the chromosomes within the new population is evaluated and unless one of the chromosomes produces an acceptable solution (a solution where the error level is below the target), the process is repeated. Over time the selective crossover will increase the relative fitness of the population and decrease the difference between the best and worst chromosomes.

The evolutionary process is enhanced in the present invention using three separate mechanisms. First, the fitness measures for individual chromosomes are re-scaled before crossover by the software in block 325 whenever the difference between the fitness of the top 10% of population and the bottom 10% of the population is less than 5% of the expected solution. To accomplish this, the fitness of the chromosome(s) with the lowest fitness is arbitrarily changed to 10% of the target value and the fitness of the chromosome (s) with the highest fitness is set to 95% of the target value. The remaining chromosomes fitness values are adjusted accordingly. This adjustment has the effect of restoring the relative advantage that the fitter chromosomes have in being selected for crossover.

The second mechanism for speeding the evolutionary process is to pick only the fittest members of a population for inclusion in the next generation. For this procedure, the current generation is combined with the two preceding generations and the fittest third from the combined population is carried forward for crossover and mutation in the next generation by the software in block 325. Finally, the sensitivity of the solution to the inclusion of all "genes" is tested when the fitness of a chromosome reaches the target level or the fitness of the population fails to increase for the maximum number of successive generations specified by the user (see System Settings, Table 12). The highest level of fitness achieved is established as the new target and processing advances to a block 330 after the resulting genes are stored in the driver genes table (183). The software in block 330 creates parallel populations where the "genes" (weights) associated with one item variable or item-performance indicator are removed from each chromosome before processing advances to a software block 335.

The software in a block 335 repeats the evolution process using the parallel population with the highest initial average fitness. If the fitness level of a chromosome in the parallel populations equals or exceeds the target value after a minimum number of generations (equal to the user specified maximum—see System Settings, Table 12) or the fitness of the population fails to increase for the user specified maximum number of successive generations, then processing advances to a block 340. If the software in block 340 determines that a chromosome in the parallel population has reached a new target level, then the genes are stored in the driver genes table (183) and the processing returns to a block 330 where process of creating parallel populations by removing potential driver "genes" is repeated. The overall process of evolution and removal of item variables and item performance indicators continues in this manner until the new parallel populations fail to reach a new target level at which point processing is advanced to a software block 345.

The software in block 345 uses the three chromosomes that achieved the highest fitness to initialize three distinct induction algorithms or causal models. While the neural network software in blocks 325 and 335 is capable of determining which item variables and item performance indicators correlate most strongly with changes in revenue, their configuration does not provide for identification of the item variables and item performance indicators that are causing changes in revenue (i.e. the "value drivers"). The item variables and item performance indicators that didn't correlate strongly with changes in revenue were "pruned" during the evolution of the high fitness chromosomes. As a result, the chromosomes in the three most "fit" chromosomes contain the item variables and item performance indicators that correlate most strongly with revenue changes. Eliminating low correlation factors from the initial configuration of the induction algorithms increases their processing efficiency.

A brief description of the three algorithms initialized by the software in block 345 are presented below in Table 23.

TABLE 23

| Induction Algorithm | Description |
| --- | --- |
| Entropy Minimization | Starting with nothing, add variables to composite variable formula as long as they increase the explainability of result |
| LaGrange | Algorithm designed to identify the behavior of dynamic systems uses linear regression of the time derivatives of the system variables. |

TABLE 23-continued

| Induction Algorithm | Description |
| --- | --- |
| Path Analysis | Essentially equivalent multiple linear regression that finds the least squares rule for more than one predictor variable. |

In addition to identifying the value drivers, these algorithms produce formulas that summarize the performance of the element being examined in causing changes in revenue.

After the models are initialized by the software in block 345, processing passes to a software block 350. The software in block 350 sub-divides the item variable, item performance indicator and revenue data into ten (10) distinct subgroups before processing passes to a block 355. The software in block 355 uses a model selection algorithm to identify the induction algorithm that best fits the data for the element being examined. For the system of the present invention, a cross validation algorithm is used for model selection. The software in block 355 optimizes each of the induction algorithms using nine (9) of the ten (10) sets of data. As part of this processing, the duplication of the information related to each item is eliminated as only the strongest causal factor variables are included in the final solution. The resulting equation from each induction algorithm is then tested using the data from the remaining set to identify the causal model that produces the best fit for that set of test data. The equations produced by the induction algorithms will hereinafter be referred to as composite variables. This process is repeated ten (10) times which allows each subgroup to be used as the basis for validating model performance. The composite variables and value drivers from the induction algorithm that produced the best results are then saved in the composite variable table (156), composite variable data table (168) and revenue driver table (179) in the application database (50) and processing returns to a block 302.

If the software in block 302 determines that there are elements that still require new revenue value driver models, then the processing described in the preceding paragraphs is repeated. Alternatively, if the software in block 302 determines that there are "current" revenue value drivers for all elements in all enterprises, then processing advances to a software block 306. The software in block 306 checks the composite variable table (156) and the expense driver table (180) in the application database (50) to determine if all enterprise expense components have "current" drivers and composite variables for all elements. If all enterprise expense components have "current" drivers and composite variables for all elements, then processing advances to a software block 312. Alternatively, if there are expense components without "current" drivers or composite variables for at least one element, then processing advances to a software block 307. The software in block 307 uses the element of value definition table (153) and excluded variable table (182) to guide the retrieval of information required to specify the next expense driver model that is being updated. All information related to the enterprise element being examined less any information identified in the excluded variable table (182) is retrieved by block 307 from the primary databases including: the basic financial system database (10), the operation management system database (15), the advanced financial system database (30), the sales management system database (35), the human resource information system database (40), and external databases found on the internet (5) by item. When all item variables have been stored in the expense driver table (180), processing advances to a software block 308.

The software in block 308 calculates expressions by item for each numeric data field and each date field in manner identical to that described previously for software block 304. After the item performance indicators are calculated and stored in the expense driver table (180) in the application database (50), processing advances to a software block 309. The software in block 309 creates a predictive time series neural net model for the expense driver in a manner similar to that described previously for block 305. After the expense value driver predictive model has been specified, processing proceeds through blocks 325, 330, 335, 340, 345, 350 and 355 in a manner identical to that described above for the processing of the revenue value driver model before returning to block 306.

If the software in block 306 determines that there are elements that still require new expense value driver models, than the processing described in the preceding paragraphs is repeated. Alternatively, if the software in block 306 determines that there are "current" expense value drivers for all elements in all enterprises, then processing advances to a software block 312. The software in block 312 checks the composite variable table (156) and the capital driver table (181) in the application database (50) to determine if all enterprise capital components have "current" drivers and composite variables for all elements. If all enterprise capital components have "current" drivers and composite variables for all elements, then processing advances to a software block 375. Alternatively, if there are capital components without "current" drivers or composite variables for at least one element, then processing advances to a software block 313. The software in block 313 uses the element of value definition table (153) and excluded variables table (182) to guide the retrieval of information required to specify the next capital driver model that is being updated. All information related to the enterprise element being examined less any information identified in the excluded variable table (182) is retrieved by block 313 from the primary databases including: the basic financial system database (10), the operation management system database (15), the advanced financial system database (30), the sales management system database (35), the human resource information system database (40), and external databases found on the internet (5) by item. When all item variables have been stored in the capital driver table (181), processing advances to a software block 314.

The software in block 314 calculates expressions by item for each numeric data field and each date field in manner identical to that described previously for software blocks 304 and 308. After the item performance indicators are calculated and stored in the capital driver table (181) in the application database (50), processing advances to a software block 315. The software in block 315 creates a predictive time series neural net model for the capital driver in a manner similar to that described previously for block 305 and 309. After the capital value driver predictive model has been specified, processing proceeds through blocks 325, 330, 335, 340, 345, 350 and 355 in a manner identical to that described above for the processing of the expense and revenue value driver models before returning to block 312.

If the software in block 312 determines that there are elements that still require new capital value driver models, than the processing described in the preceding paragraphs is repeated. Alternatively, if the software in block 312 determines that there are "current" capital value drivers for all elements in all enterprises, then processing advances to a software block 317. The software in block 317 checks the element of value definition table (153) and sub-element definition table (154) to determine if the user (20) has specified that there will be sub-elements of value for any of the elements. If the user (20) has specified that there will be no sub-elements of value, then processing advances to a block 375 where the elements are checked for interaction. Alternatively, if there are elements of value with sub-elements, then processing advances to a software block 318. The software in block 318 checks the element of value definition table (153) to determine the number of elements that have sub-elements before advancing processing to a block 319.

The software in block 319 retrieves the element of value definition for the next element with defined sub-elements from the element of value definition table (153) before advancing processing to a block 321. The software in block 321 checks the sub-element definition table (154) to determine if the sub-elements assignments for all items within the element are "current". If the sub-element assignments are "current", then processing returns to block 318 which checks to see if all elements with sub-elements have been reviewed in the current cycle of processing. If the software in block 318 determines that all elements have been reviewed, then system processing advances to a software block 332. Alternatively, if there are elements still need to be reviewed, then processing returns to block 319 as described previously. If the software in block 319 determines that the sub-element assignments are not "current", then processing advances to a block 326 where the sub-element assignments are completed.

The software in block 326 checks the system settings table (140) to determine if the calculation being completed is a stand-alone calculation or a comparison to a prior calculation. If the software in block 326 determines that the current calculation is not being used for a comparison, then the processing advances to a software block 322. The software in block 322 retrieves the value driver data by item for the element being analyzed from the composite variable data table (168) before creating a normalized set of value driver data for each item within the element of value being analyzed. The normalized value for each value driver data element for each item in each period is then calculated using Formula 3 shown below.

$$\text{Normalized Value} = \frac{\text{Current value} - MN}{(MP - MN)} \quad \text{Formula 3}$$

Where:

$MN$ = minimum positive or most negative data value for all elements items $MP$ = maximum positive data value for all element items After the normalized data are saved in the normalized composite variable data table (169) in the application database (50), system processing advances to a software block 323. The software in block 323 uses an unsupervised "Kohonen" neural network that uses competitive learning to create a clustering scheme and segment the element of value. As shown in FIG. 11 a "Kohonen" network has only two layers—an input layer (712) and an output layer (713). The input layer (712) holds the input nodes (750-x) where the different inputs are sequentially entered. The input patterns are transmitted to an output layer (713) which has one node (760-x) for each possible output category. The input layer and the output layer are fully interconnected as shown in FIG. 11. The different variables are defined in Table 24.

TABLE 24

| Variable | Definition |
| --- | --- |
| P | The number of items for the element. Equals the number of different patterns that will be presented to the network |
| M | The number of variables the in the composite variable for the element as well as the number of input nodes (750-1 through 750-M) |
| N | The maximum number of sub-elements for this element (default is 20) as well as the number of output nodes (760-1 through 760-N) |
| $\omega_{ij}$ | Represents the connection strength between unit j of the input layer (712) and unit i of the output layer (713) |
| $X_j$ | Represents the input vector which is the normalized value of the "$j^{th}$" item composite variables |
| $V_i$ | Matching value - measures how closely the weights of a given node matches the input vector |

"Kohonen" network processing begins when the software in block 323 initializes at random the weights (716) between the output layer (713) and the input layer (712) with small values. In the next step the system starts sequentially entering the normalized composite variable data from the normalized composite variable data table (169) into the input layer (712). The normalized value for each variable is entered into a different input node (750-x) and transmitted from there to the output layer (713). The nodes in the output layer (760-x) each compute their matching values (Vi) using Formula 4 shown below:

Formula 4

$$V_i = \Sigma(\omega_{ij} - x_j)^2$$

The matching value ($V_i$) essentially represents the distance between the vectors ($\omega_i$) and x. Therefore the output node (760) with the lowest matching value is also the node that most closely matches the input vector. The unit that is closest to the input is declared the winner and its weight ($\omega_{ij}$) along with the weights of the neighboring output nodes are updated. The change in weight for the winning node and its neighbors is calculated using Formula 5 shown below.

Formula 5

$$\Delta\omega_{ij} = \alpha(x_j - \omega_{ij})$$

where: α represents the learning rate (see Formula 6)
The application of this formula diminishes the difference between the weights of the output nodes and the weights of the input vectors. Output nodes that are not neighbors of the winning node are not updated. The output nodes are updated after each input and over time the application of the formulas shown above will tend to create clusters of similar nodes.

The input vectors (data patterns) are cycled through the "Kohonen" network a pre-determined number of times which are referred to as epochs. The total number of epochs (T) will be set by the software to somewhere between 500 and 10,000 depending upon the number of composite sort variables used for the element. The neighborhood size, that is the quantity of adjacent nodes that are considered to be neighbors, is adjusted downward from its initial value of 75% of the value of N by one node at a time as the number of epochs increases from zero (0) to its maximum number (T). The learning rate (α) is determined by Formula 6 shown below.

Formula 6

$$\alpha = 0.2 \times (1 - (T/10,000))$$

Once the Kohonen network processing has been completed for the specified number of epochs (T), the software in block 323 arbitrarily assigns a number to each output node (760-x). The software in block 323 then calculates the distance between the input vector (x) of each item and the weight in each output node (760-x) using Formula 4. The software in block 323 then assigns the number of the closest output node (760-x) to the item and stores the resulting information in the sub-element definition table (154) in the application database (50). The software in block 323 also stores the final value of all network weights in the sub-element weights table (157) in application database (50).

After the network weights and information assigning each item to a sub-element have been stored in the appropriate tables in the application database (50), processing returns to software block 318 and the process described above is repeated until all elements with sub-elements of value have been reviewed.

If the software in block 326 determines that the calculation being completed is a comparison to a prior valuation, then processing advances to a software block 327. The software in block 327 retrieves the sub-element weights from the previous calculation from the sub-element weights table (157) and reestablishes the prior sub-element assignments by using Formula 4 to determine the appropriate sub-element assignment for each item. When this processing has been completed, processing advances to a software block 328.

The software in block 328 checks the composite variable data table (168) to see if there are any new items for elements being analyzed. If there are no new items, then processing returns to block 318 as described previously. Alternatively, if the software in block 328 determines that there are new items, then processing advances to a software block 329.

The software in block 329 determines the appropriate sub-element assignment for each new item by calculating the normalized value of the input vector for each new item and using formula 4 to determine which output node (i.e., which sub-element from the previous calculation) each item should be assigned to. The inputs for these calculations are stored in the normalized composite variable data table (169) and the results are stored in the composite variable data table (168) in the application database before processing returns to block 318 as described previously.

When the software in block 318 determines that all elements have been reviewed, processing advances to block 332 as described previously. The software in block 332 checks the composite variable (156), revenue driver (179), expense driver (180) and capital driver (181) tables to determine if the value drivers and composite variables for all sub-elements are current. If they are current, then processing advances to a software block 375. Alternatively, if the sub-element drivers and composite variables are not current, then processing advances to a block 337.

The software in block 337 checks the revenue driver table (179) in the application database (50) to determine if all enterprise revenue sub-components have "current" drivers and composite variables for all elements. If all enterprise revenue sub-components have "current" drivers and composite variables for all elements, then processing advances to a software block 341. Alternatively, if there are any revenue components without "current" drivers for at least one element, then processing advances to a software block 338. The software in block 338 uses the sub-element definition table (154) and excluded variables table (182) to guide the retrieval of information required to specify the next revenue driver model that is being updated. All information related to the enterprise element being examined less any information identified in the excluded variable table (182) is retrieved by block 338 from the primary databases including: the basic financial system database (10), the operation management system database (15), the advanced financial system database (30), the sales management system database (35), the human resource information system database (40), and external databases found on the internet (5) by item. When all item variables have been stored in the revenue driver table (179), processing advances to a software block 339.

The software in block 339 calculates performance indicators by item for each date and numeric data field in a manner similar to that described for block 304. After the item performance indicators are calculated and stored in the revenue driver table (179) in the application database (50), processing advances to a software block 305. The software in block 305 creates a predictive time series neural net model for the revenue driver as described previously. After the revenue value driver predictive model has been specified, processing proceeds through blocks 325, 330, 335, 340, 345, 350 in a manner identical to that described previously for the processing of the revenue value driver model before advancing to a block 360.

The software in block 360 uses a model selection algorithm to identify the induction algorithm that best fits the data for the element being examined. For the system of the present invention, a cross validation algorithm is used for model selection. The software in block 360 optimizes each of the induction algorithms using nine (9) of the ten (10) sets of data. As part of this processing, the duplication of the information related to each item is eliminated as only the strongest causal factor variables are included in the final solution. The composite variable from each induction algorithm is then tested using the data from the remaining set to identify the causal model that produces the best fit for that set of test data. The previously calculated composite variable for the revenue element is also compared to the sub-element composite variables as part of this processing. This process is repeated ten (10) times which allows each subgroup to be used as the basis for validating model performance. The composite variable and value drivers that produced the best results are then saved in the composite variable table (156), composite variable data table (168) and revenue driver table (179) in the application database (50) and processing returns to a block 337.

If the software in block 337 determines that there are sub-elements that still require new revenue value driver models, then the processing described in the preceding paragraphs is repeated. Alternatively, if the software in block 337 determines that there are "current" revenue value drivers for all sub-elements in all enterprises, then processing advances to a software block 341. The software in block 341 checks the expense driver table (180) in the application database (50) to determine if all enterprise expense components have "current" drivers for all elements. If all enterprise expense components have "current" drivers for all sub-elements, then processing advances to a software block 352. Alternatively, if there are expense sub-components without "current" drivers for at least one element, then processing advances to a software block 342. The software in block 342 uses the sub-element definition table (154) and excluded variables table (182) to guide the retrieval of information required to specify the next expense driver model that is being updated. All information related to the enterprise sub-element being examined less any information identified in the excluded variable table (182) is retrieved by block 342 from the primary databases including: the basic financial system database (10), the operation management system database (15), the advanced financial system database (30), the sales management system database (35), the human resource information system database (40), and external databases found on the internet (5) by item. When all item variables have been stored in the expense driver table (180), processing advances to a software block 343.

The software in block 343 calculates expressions by item for each numeric data field and each date field in manner identical to that described previously for software block 339. After the item performance indicators are calculated and stored in the expense driver table (180) in the application database (50), processing advances to a software block 309. The software in block 309 creates a predictive time series neural net model for the expense driver as described previously. After the expense value driver predictive model has been specified, processing proceeds through blocks 325, 330, 335, 340, 345, 350 and 360 in a manner identical to that described above for the processing of the revenue value driver model before returning to block 341.

If the software in block 341 determines that there are sub-elements that still require new expense value driver models, then the processing described in the preceding paragraphs is repeated. Alternatively, if the software in block 341 determines that there are "current" expense value drivers for all sub-elements in all enterprises, then processing advances to a software block 352. The software in block 352 checks the capital driver table (181) in the application database (50) to determine if all enterprise capital components have "current" drivers for all elements. If all enterprise capital components have "current" drivers for all sub-elements, then processing advances to software block 375. Alternatively, if there are capital sub-components without "current" drivers for at least one element, then processing advances to a software block 353. The software in block 353 uses the sub-element definition table (154) and excluded variables table (182) to guide the retrieval of information required to specify the next capital driver model that is being updated. All information related to the enterprise sub-element being examined less any information identified in the excluded variable table (182) is retrieved by block 353 from the primary databases including: the basic financial system database (10), the operation management system database (15), the advanced financial system database (30), the sales management system database (35), the human resource information system database (40), and external databases found on the internet (5) by item. When all item variables have been stored in the capital driver table (181), processing advances to a software block 354.

The software in block 354 calculates expressions by item for each numeric data field and each date field in manner identical to that described previously for software blocks 339 and 343. After the item performance indicators are calculated and stored in the capital driver table (181) in the application database (50), processing advances to a software block 315. The software in block 315 creates a predictive time series neural net model for the capital driver as described previously. After the capital value driver predictive model has been specified, processing proceeds through blocks 325, 330, 335, 340, 345, 350 and 360 in a manner identical to that described above for the processing of the revenue value driver model before returning to block 352.

If the software in block 352 determines that there are sub-elements that still require new capital value driver models, then the processing described in the preceding paragraphs is repeated. Alternatively, if the software in block 352 determines that there are "current" capital value drivers for all sub-elements in all enterprises, then processing advances to software block 375.

The software in block 375 checks the value drivers to determine if there is any interaction between drivers for different elements. If interaction between element drivers is discovered, then processing advances to a block 402 where the valuation of growth options is started. Alternatively, if no interaction between element drivers is found, then system processing is completed in accordance with the specification of U.S. patent application Ser. No. 08/779,109.

Growth Option Valuation

The flow diagram in FIG. 7 details the processing that is completed by the portion of the application software (400) that calculates the value of the growth options for each enterprise. Processing begins in block 402 where the software in the block checks the growth option value table (178) to determine if there are "current" valuations for all defined growth options. If there are no defined growth options or no growth options that require a new valuation, then processing advances to a transfer block 403 and on to a block 501 where the components of value are analyzed.

If there are growth options that need a value calculation completed, then system processing advances to a software block 404 where the software in the block retrieves the previously stored data from the growth option definition table (175) for the next growth option and then advances processing to a block 405. The software in block 405 checks the growth option definition table information to determine if there are multiple scenarios for the growth option being analyzed. If there is only one scenario for the growth option being analyzed, then processing advances to a block 407. Alternatively, if there are multiple scenarios, then processing advances to a block 408.

The software in block 408 prompts the user (20) via the growth option scenario definition data window (916) to input or update: the number of scenarios, the name of the scenarios and the probability that each scenario will occur for the growth option being valued. The probability of each scenario is specified as a percentage. The sum of the scenario probabilities must equal 100% for each growth option. The user (20) is allowed to change the scenarios even if the system (100) is calculating a business valuation comparison as the comparison will be made at the growth option level not at the scenario level. The input from the user (20) is stored in the growth option definition table (175) in the application database (50) before processing advances to a block 409.

The software in block 409 checks the growth option scenario table (177) in the application database (50) to determine if there are "current" data for every scenario listed in the growth option definition table (175). If there are "current" data for all scenarios, then processing advances to block 407 where the value of the total deductions from revenue components, expense sub-components, capital sub-components and elements of value for the growth option are calculated. Alternatively, if some or all of the scenarios for the growth option being examined don't have "current" data, then processing advances to a block 410. The software in block 410 retrieves the information for the scenario from the growth option scenario table (177) and advances processing to a software block 411.

The software in block 411 generates a form that is displayed using a scenario revenue and expense data window (917) for the user (20) to complete. The form identifies the time periods that revenue and expense forecasts are required for the growth option scenario in accordance with the calculations previously completed by the application software and stored in the system settings table (140). The forecast information the user (20) provides is saved to the growth option scenario table (177) in the application database (50). If the scenario being examined is the first scenario for the growth option, then the user (20) is also asked to quantify any growth-option related expenses by account number that were incurred in prior periods. The user (20) is not asked to identify any prior period growth option revenue as a growth option is by definition a project that will lead to revenue at some date in the future. The information regarding prior period expenses is saved in expense data table (142) in the application database (50). The user (20) is also asked to identify the months where the prior expenses and/or the forecast revenue and the forecast expenses for the growth option scenario were included in the overall company totals. The users input regarding the overlapping periods for the scenario is saved in the growth option overlap table (176) in the application database (50) and processing advances to a software block 412.

The software in block 412 prompts the user (20) via a scenario capital data window (918) to edit or provide a forecast of the capital requirements for the scenario by month for the time periods required for growth option valuation in accordance with the calculations previously completed by the application software and stored in the system settings table (140). The forecast information the user (20) provides is saved to the growth option scenario table (177) in the application database (50). If the scenario being examined is the first scenario for the growth option, then the user (20) is also asked to quantify any growth-option related capital investments by account number that were present in prior periods. The information regarding prior period capital requirements is saved in the capital data table (143) in the application database (50). The user (20) is also asked to identify the months where the prior period actual and/or forecast capital requirements for the growth option scenario were included in the overall company totals. The users input regarding overlapping periods for the scenario is saved in the growth option overlap table (176) in the application database and processing advances to a software block 413.

The software in block 413 prompts the user (20) via a scenario element of value data window (919) to edit or provide a forecast of element of value usage by month for the time periods required for growth option valuation in accordance with the calculations previously completed by the application software. The forecast information the user (20) provides is saved to the growth option scenario table (177) in the application database (50). If the scenario being examined is the first scenario for the growth option, then the user (20) is also asked to identify any growth-option related element of value usage that occurred in prior periods. The information regarding prior period use of the elements of value is saved in the element of value data table (144). The user (20) is also asked to identify the months where the prior period and/or forecast element of value usage for the growth option were included in the overall company totals. The users input regarding overlapping periods is saved in the growth option overlap table (176) in the application database and processing returns to a software block 409.

If the software in block 409 determines that there are still scenarios that don't have "current" data, then the processing sequence described above is repeated until all scenarios have "current" data. When all scenarios for the growth option being analyzed have "current" data, processing advances to block 407. The software in block 407 calculates the total value of revenue, expense, capital and element of value deductions for each scenario. The software in block 407 also calculates the weighted average forecast of total growth option revenues, expenditures, capital and element of value deductions for each period by multiplying the forecast revenue, capital and element of value deductions for each scenario by the probability of that scenario realization. The totals for the growth option revenue, expense, capital, and element of value deductions are then saved in the appropriate data tables (141 through 146) in the application database (50). After the data have been stored, processing advances to a software block 406 where the value of the growth option is calculated using dynamic programming algorithms in a manner that is well known. The process described in the preceding paragraphs is repeated until all growth options have "current" valuations and processing advances to block 502 as described previously.

Analyze Components of Value

The flow diagram in FIG. 8 details the processing that is completed by the portion of the application software (500) that analyzes the components and sub-components of value. Processing begins in a software block 502. The software in block 502 checks the enterprise value table (170) in the application database (50) to determine if there are "current" valuations for all enterprises for the date for which the current valuation is being calculated. If there are "current" valuations for all enterprises, then processing advances to a software block 515 where the software in the block calculates the total company current operation value. However, if some or all of the enterprises don't have "current" valuations, then processing advances to a software block 503.

The software in block 503 retrieves the definition for the next enterprise that doesn't have a "current" valuation from the enterprise definition table (155) in the application database (50). Processing then advances to a software block 504. The software in block 504 checks the data from the revenue component definition table (150) for the revenue component of the enterprise being valued to determine if there is a "current" valuation for the component. If there is a "current" valuation for the revenue component, then processing advances to a software block 507 where the values of the expense component or expense sub-components for the enterprise are checked to determine if they are "current". However, if the revenue component valuation isn't "current", then processing advances to a software block 505. The software in block 505 retrieves the information for the revenue component from the revenue data table (141) and processing advances to a software block 506. In accordance with the present invention, the revenue component value is calculated for the specified date of valuation using Formula 7 shown below.

$$\text{Value} = F_{f1}/(1+K) + F_{f2}/(1+K)^2 + F_{f3}/(1+K)^3 + F_{f4}(1+K)^4 + (F_{f4} \times (1+g))/((K-g) \times (1+K)^4) \quad \text{Formula 7}$$

Where:

$F_{fx}$ = Forecast revenue, expense or capital for year × after valuation date (from advanced financial system)

$K$ = Cost of capital – % per year (from system settings)

$g$ = Forecast growth rate to perpetuity – % per year (from advanced financial system)

After the valuation of the revenue component is complete, the result is stored in the revenue component definition table (150) in the application database (50) and processing advances to a software block 507.

The software in block 507 checks the expense component definition table (151) in the application database (50) to determine if there are "current" valuations for all expense components or sub-components in the enterprise being valued. If the user (20) has previously stored information in the system settings table (140) specifying a "simplified" analysis, then the expense component values will be checked. Alternatively, if the user (20) has not selected a simplified analysis, then the expense sub-component values will be checked. The software in block 507 considers all expense components and sub-components that are directly valued to be "current." If there are "current" valuations for the expense components or all sub-components, then processing advances to a block 510 where the values of the capital components for the company are checked to determine if they are "current". However, if some or all of the expense components or sub-components don't have "current" valuations, then processing advances to a software block 508. The software in block 508 retrieves the information from the expense data table (142) for the expense component or the next expense sub-component that doesn't have a "current" valuation. Processing then advances to a software block 509. In accordance with the present invention the valuation of the expenses is calculated for the specified date of valuation using Formula 7. After the valuation of the expense component or expense sub-component has been completed, the results are stored in the expense component definition table (151) in application database (50) and processing returns to a software block 507. If there are still expense sub-components that don't have current valuations, then the processing described above is repeated for the next sub-component. Alternatively, if the expense component or all expense sub-components have current valuations, then processing advances to a software block 510.

The software in block 510 checks the capital component definition table (152) in the application database (50) to determine if there are "current" valuations for all capital components. If the user (20) has previously stored information in the system settings table (140) specifying a "simplified" analysis, then the capital component value for the enterprise will be checked. Alternatively, if the user (20) has not selected a simplified analysis, then the standard capital sub-components will be checked. If there are "current" valuations for all capital components, then processing advances to a software block 514 where the enterprise current operation value is calculated. If the valuation for the capital component or some of the capital sub-components is not "current", then processing advances to a software block 511. The software in block 511 considers all capital components and sub-components that are directly valued to be "current." The software in block 511 retrieves the information required for valuation of the next capital component or sub-component that doesn't have a "current" valuation from the capital data table (143) in the application database (50). Processing then advances to a software block 512. The software in block 512 calculates the value of the capital component or capital sub-component using Formula 7. After the valuation of the capital component or a capital sub-component is complete, the results are stored in the capital component definition table (152) in the application database (50) and system processing returns to block 510. If there are still capital sub-components that don't have current valuations, then the processing described above is repeated for the next sub-component. Alternatively, if the capital component or all capital sub-components have current valuations, then processing advances to a software block 514.

The software in block 514 calculates the current operation value of each enterprise by summing the previously calculated component and sub-component values as shown in Table 4. The calculated value for the enterprise current operation is stored in the enterprise value table (170) in the application database (50) and processing returns to block 502 which again checks the enterprise value table (170) in the application database (50) to determine if all enterprises have "current" values. If there are still enterprises without "current" values, then processing advances to block 503 and the processing described in the preceding paragraphs is repeated for another enterprise. Alternatively, if all the enterprises have "current" values, then processing transfers to a block 515 where the software in the block adds the enterprise values together to calculate the value of the current-operation for the total company. The total company current-operation value is stored in the enterprise value table (170) in the application database (50) and processing advances to a software block 602 where the predictive model specification and optimization is started.

Predictive Model Specification and Optimization

The flow diagrams in FIG. 9A and FIG. 9B detail the processing that is completed by the portion of the application software (600) that uses predictive models to determine the relationship between the value drivers and the revenue, expense and capital components of all defined enterprises. Processing begins in software block 602. The software in block 602 checks the revenue model weights table (159) in the application database (50) to determine if the revenue components for all enterprises have "current" models. If there are revenue components without "current" predictive models, then processing advances to a software block 603 where the information specifying the next revenue component is retrieved from the revenue component definition table (150) in the application database (50). After the revenue component definition has been retrieved, processing advances to a software block 604 where the software in the block creates a predictive time series neural net model for the revenue component. More specifically, the software in the block creates a neural network model that relates the value drivers for a given enterprise to the revenue component.

The software in block 604 determines the number of the input nodes and hidden nodes for the network as a function of the number of value drivers associated with the enterprise revenue component. There are also additional input nodes for prior period revenue and for a threshold node. The software in block 604 sets the initial number of hidden layers to one. The software in block 604 also establishes one output node for the revenue and sets all weights to random numbers between 0 and 1 (except the threshold node weight which is fixed at 1). The processing completed by the network nodes (710-x, 720-x and 730) was described previously. After the network architecture including the nodes has been specified by the software in block 604, processing advances through blocks 325, 330, 335 and 340 as described previously.

The process of evolving a preliminary solution continues until the new parallel populations fail to reach a new target level and processing is then advanced to a block 625. As part of this processing revenue model genes are stored in the expense model genes table (160) in a manner identical to that described previously for the storage of model genes. The software in block 625 uses the chromosome that achieved the highest fitness to initialize a feed-forward neural network. In a manner that is well known, the network is then trained by the software in a block 630 using a traditional backpropagation algorithm to further minimize the error function associated with the network. The resulting weights for the enterprise are then saved in the revenue model weights table (159) in the application database (50) and processing returns to a block 602.

If the software in block 602 determines that there are "current" revenue models for all enterprises, then processing advances to a software block 605. The software in block 605 checks the expense model weights table (161) in the application database (50) to determine if the expense component or all expense sub-components have "current" models. If the user (20) has previously stored information in the system settings table (140) specifying a "simplified" analysis, then the expense component model will be checked before processing advances to another block. Alternatively, if the user (20) has not selected a simplified analysis, then the expense sub-component models will be checked before processing advances to another block. In either case, processing will advance to block 607 if the expense models aren't "current" and to block 611 if they are "current".

The software in block 607 retrieves the information specifying the expense component or the next expense sub-component from the expense component definition table (151) in the application database (50). After the required information is retrieved, processing advances to a block 320 which checks the expense component definition table (151) to see if the current component/sub-component is a direct component/sub-component. If the current component/sub-component is directly valued, then processing returns to block 605 where the next sub-component is retrieved. Alternatively, if the sub-component is not directly valued, then processing advances to a software block 608 where the predictive expense model is specified in a manner similar to that described previously for the predictive revenue model. From block 608, processing advances to blocks 325, 330, 335, 340, 625 and 630 where the genetic evolution of the fittest solution is completed in a manner similar to that described above for the predictive revenue model. As part of this processing expense model genes are stored in the expense model genes table (160) in a manner identical to that described previously for the storage of revenue model genes. If there are sub-components, then the process described above is repeated until all expense sub-components have "current" models. When all expense components or all expense sub-components have "current" models, processing advances to a software block 611.

The software in block 611 checks the capital model weights table (163) in the application database (50) to determine if the capital component or all capital sub-components have "current" models. If the user (20) has previously stored information in the system settings table (140) specifying a "simplified" analysis, then the capital component model will be checked before processing advances to another software block. Alternatively, if the user (20) has not selected a simplified analysis, then the standard capital sub-component models will be checked before processing advances to another software block 613. In either case, processing will advance to block 613 if the models aren't "current" and to block 772 if they are "current".

The software in block 613 retrieves the information specifying the capital component or the next capital sub-component from the capital component definition table (152) in the application database (50). After the required information is retrieved, processing advances to a block 320 which checks the capital component definition table (152) to see if the current component/sub-component is a direct component/sub-component. If the current component/sub-component is directly valued, then processing returns to block 611 where the next sub-component is retrieved. Alternatively, if the sub-component is not directly valued, then processing advances to a software block 614 where the predictive capital model is specified in a manner similar to that described previously for the predictive revenue and expense models. From block 614, processing advances to blocks 325, 330, 335, 340, 625 and 630 where the genetic evolution of the fittest solution is completed in a manner similar to that described above for the predictive revenue and expense model. As part of this processing, capital model genes are stored in the capital model genes table (162) in a manner identical to that described previously for the storage of revenue and expense model genes. If there are sub-components, then the process described above is repeated until all capital sub-components have "current" models. When all capital components or all capital sub-components have "current" models, processing advances to a block 772 where valuations are calculated for the elements and sub-elements of value.

Value All Elements and Sub-Elements of Value

The flow diagram in FIG. 12 details the processing that is completed by the portion of the application software (700) that values all elements and sub-elements of current-operation value for all enterprises. Processing begins in software block 772. The software in block 772 checks the revenue component percentage table (164) in the application database (50) to determine if the revenue component models for all enterprises have "current" percentages. If there are revenue components without "current" percentages, then processing advances to a block 773 where the information specifying the next revenue component is retrieved from the revenue component definition table (150) and the revenue model weights table (159) in the application database (50).

After the revenue component information is retrieved, processing advances to a block 774 where relationships between the elements and sub-elements of value and the revenue component are determined. The software in block 774 uses the network weights (706 and 707) previously stored in the revenue model weights table (159) to segregate the hidden-layer (703) to output-layer (704) connection weights (707) for each hidden node (720-x) into the components associated with each input node (710-x). The portion of the output attributable to each input node is then determined by Formula 8 (shown below).

$$\left( \sum_{k=1}^{k=m} \sum_{j=1}^{j=n} I_{jk} \times O_k \Big/ \sum_{j=1}^{j=n} I_{ik} \right) \Big/ \sum_{k=1}^{k=m} \sum_{j=1}^{j=n} I_{jk} O_k \quad \text{Formula 8}$$

Where
$I_{jk}$=Absolute value of the input weight (706) from input node j to hidden node k
$O_k$=Absolute value of output weight (707) from hidden node k
m=number of hidden nodes
n=number of input nodes After Formula 8 is solved by the software in block 774, the portion of the revenue value attributable to each element or sub-element of value is calculated by adding together the percentages from all value drivers associated with each element or sub-element of value. The result of these calculations is then stored in the revenue component percentage table (164) in the application database (50). The portion of the revenue value that can't be attributed to an element or sub-element of value is generally the portion that is attributed to the prior period revenue. This portion of the value will be referred to as going concern revenue component. After the storage of the revenue component percentages has been completed, processing returns to block 772. The software in block 772 checks the application database (50) to determine if all revenue components have "current" model percentages. If there are still revenue components without "current" percentages, then the system repeats the processing described in the preceding paragraphs. Alternatively, if all of the revenue component models have "current" percentages, then processing advances to a software block 775.

The software in block 775 checks the expense component percentage table (165) in the application database (50) to determine if all expense component or sub-component models for all enterprises have "current" percentages. If the user (20) has previously stored information in the system settings table (140) specifying a "simplified" analysis, then the expense component percentages will be checked. Alternatively, if the user (20) has not selected a simplified analysis, then the expense sub-component percentages will be checked. Expense sub-components that are valued directly are "current" and are not analyzed by this portion of the application software. If there are expense components or sub-components without "current" percentages, then processing advances to a software block 776 where the information specifying the next expense component or sub-component is retrieved from the expense component definition table (151) and the expense model weights table (161) in the application database (50). After the expense component or sub-component information is retrieved, processing advances to a software block 777 where the percentages of value for the expense component or sub-component are calculated in a manner identical to that described previously for revenue components. The portion of the expense value that can't be attributed to an element or sub-element of value is generally the portion that is attributed to the prior period expense. This portion of the value will be referred to as going concern expense component. After the storage of the percentages of the expense component or sub-component to the expense component percentage table (165) has been completed, processing returns to block 775. The software in block 775 checks the expense component percentage table (165) in the application database (50) to determine if all expense component or sub-component models have "current" percentages. If there are still expense component or sub-component models without "current" percentages, then the system repeats the processing described above. Alternatively, if all of the expense component or sub-component models have "current" percentages, then processing advances to a software block 778.

The software in block 778 checks the capital component percentage table (166) in the application database (50) to determine if all capital component or sub-component models for all enterprises have "current" percentages. If the user (20) has previously stored information in the system settings table (140) specifying a "simplified" analysis, then the capital component percentages will be checked. Alternatively, if the user (20) has not selected a simplified analysis, then the capital sub-component percentages will be checked. Capital sub-components that are valued directly are "current" and are not analyzed by this portion of the application software. If there are capital component or sub-component models without "current" percentages, then processing advances to a software block 779 where the information specifying the next capital component or sub-component is retrieved from the capital component definition table (152) and the capital model weights table (163) in the application database (50). After the capital component or sub-component information is retrieved, processing advances to a software block 780 where the percentages of value for the capital component or sub-component are calculated in a manner identical to that described previously for revenue and expense components. The portion of the capital element or sub-element value that can't be attributed to an element or sub-element of value is generally the portion that is attributed to the prior period capital requirements. This portion of the value will be referred to as going concern capital value. After the storage of the percentages of the capital component or sub-component to the capital component percentage table (166) has been completed, processing returns to block 778. The software in block 778 checks the capital component percentage table (166) in the application database (50) to determine if all capital components or sub-components have "current" percentages. If there are still capital component or sub-component models without "current" percentages, then the system repeats the processing described above (779 and 780). Alternatively, if all of the capital components or sub-components have "current" percentages, then processing advances to a software block 781.

The software in block 781 combines all the revenue component, expense component or sub-component and capital component or sub-component values together to calculate the overall value for each element or sub-element of value by enterprise as shown in Table 4. As part of the processing in this block, the calculated value of production equipment element (or sub-elements) of value is compared to the liquidation value for the equipment in the element. The stored value for the element (or sub-elements) will be the higher of liquidation value or calculated value. After the calculations are completed, processing advances to a software block 782 where the residual going concern value is calculated using Formula 9.

Formula 9

Residual Going Concern Value=Total Current–Operation Value–ΣFinancial Asset Values–ΣElements of Value–ΣSub-Elements of Value After the residual going concern value is calculated for each enterprise, the values calculated for each element and sub-element of value (including going concern value) by the software in blocks 781 and 782 are stored by enterprise in the enterprise value table (170) in the application database (50). System processing then advances to a software block 802 where the preparation of the management reports is started.

Analyze Improvement Scenarios and/or Produce Reports

The flow diagram in FIG. 13 details the processing that is completed by the portion of the application software (800) that creates, displays and optionally prints financial management reports. The primary management report, the Value Map™, summarizes information about the elements and sub-elements of business value on the valuation date. If a comparison calculation has been completed, a Value Creation report can be generated to highlight changes in the elements and sub-elements of business value during the period between the prior valuation and the current valuation date.

System processing in this portion of the application software (800) begins in block 802. At this point in system processing, virtually all of the information required to produce the Value Map™ has been calculated using the methods outlined in Table 1 as detailed in the preceding sections. As a result, the only computation that needs to be made is the calculation of economic equity. The software in block 802 retrieves the required information from the enterprise value table (170), debt data table (174) and equity data table (144) in the application database (50) and then calculates the economic equity for the business as a whole using Formula 10 (shown below).

$$\text{Economic Equity} = (\text{Current Operation Value}) + \left(\sum \text{Growth Option Values}\right) - (\text{Current Liabilities}) - (\text{Current Debt}) - (\text{Book}^*\text{Equity Value})$$

Formula 10

*calculated in accordance with GAAP

An equity value for each enterprise is then calculated by dividing the combined book and economic equity as required to balance the Value Map™ totals in accordance with Formula 11 (shown below).

$$\text{Enterprise Equity} = (\text{Enterprise Current Operation Value}) + \left(\sum \text{Enterprise Growth Option Values}\right) - (\text{Current Enterprise Liabilities}) - (\text{Current Enterprise Debt})$$

Formula 11 where $\sum (\text{Enterprise Equity}) = \text{Book}^*\text{Equity} + \text{Economic Equity}$

*calculated in accordance with GAAP

After the economic equity value and the enterprise equity values are calculated and stored in the economic equity values table (171), a summary Value Map™ (see FIG. 14 for format) for the entire company is created and stored in the reports table (172) and processing advances to a software block 803. The software in block 803 checks the system settings table (140) to determine if the current valuation is being compared to a previous valuation. If the current valuation is not being compared to a previous valuation, then processing advances to a software block 805. Alternatively, if the current valuation is being compared to a previously calculated valuation, then processing advances to a software block 804.

The software in block 804 calculates Value Creation Statements (see FIG. 15 for format) for each enterprise and for the business as a whole for the specified time period. After the Value Creation Statements are stored in the reports table (172) in the application database (50), processing advances to a software block 805. The software in block 805 displays the summary Value Map™ to the user (20) via a report data window (909).

After displaying the summary Value Map™, system processing advances to a software block 806 where the user is prompted via a report selection data window (915) to designate additional reports for creation, display and/or printing. One report the user (20) has the option of selecting at this point analyzes the relationship between the market value of the business and the calculated business value. The user (20) has the option of creating, displaying or printing the Value Map™ for the company as a whole and/or for any combination of the enterprises within the company. The user (20) can also choose to create, display or print an Value Creation Statement for the business as a whole and/or for any combination of enterprises if a comparison calculation were being made. The software in block 806 creates and displays all Value Maps™ and Value Creation Statements requested by the user (20) via the report selection data window (915). The report selection data window (915) also gives the user (20) the option of indicating if business improvement programs are going to. After the user (20) has completed the review of displayed reports and the input regarding reports to print and improvement analysis has been stored in the reports table (172), processing advances to a software block 807. The software in block 807 transfers processing to a software block 808 if the user (20) has chosen to have the report analyzing the relationship between market value and calculated business value created. The software in block 808 compares the market value of the business to the calculated value by completing the Formula 12 for each complete valuation stored in the reports table (172).

Formula 12

$$((\Sigma EXN)-D)=(YXV)$$

Where:
E=Market price of equity for valuation date
N=Number of shares of equity outstanding on valuation date
D=Market value of debt on valuation date
Y=Market value/calculated business value ratio
V=Total calculated business value on the valuation date The average ratio of market value to calculated business value and the standard deviation of the ratio are then calculated using standard regression analysis methods and stored in the equity forecast table (148) in the application database.

If the date of the current valuation is more than 60 days after the current system date, then the software in block 808 will calculate a range for equity prices on the valuation date by combining the results of previous calculations of the relationship between equity value and calculated value with the forecast of future value that was just completed. The software will calculate the future equity value range using both the average ratio of total business value to total market value. The software in block 808 then prepares a report summarizing the results of the preceding calculations that is stored in the reports table (172) in the application database (50) and processing advances to a software block 809. If the user (20) elects not to complete the calculated valuation versus equity price analysis, then the software in block 807 advances processing directly to a software block 809.

The software in block 809 checks the reports tables (172) to determine if any reports have been designated for printing. If reports have been designated for printing, then processing advances to a block 810 which prepares and sends the designated reports to the printer (118). After the reports have been sent to the printer (118), processing advances to a software block 811 where the software in the block examines the reports tables (172) to determine if improvement programs will be analyzed as part of system processing. If no reports were designated for printing then processing advances directly from block 809 to 811 to determine if improvement programs will be analyzed as part of system processing. In either case, if the software in block 811 determines that no improvement programs are going to be analyzed, then processing advances to a block 812 where processing stops. Alternatively, if improvement programs are going to be analyzed as part of system processing, then processing advances to a software block 852. The software in block 852 retrieves data from the composite variable table (152), the composite variable data table (168), the revenue driver table (179), the expense driver table (180) and the capital driver table (181) and then prompts the user (20) via a value driver changes data window (920) to specify planned changes in value drivers or to establish a goal for the simulation. The software in block 852 stores the input from the user in the scenario table (184) in the application database (50).

After data storage is complete, processing advances to a software block 853 where the software in the block retrieves information from the composite variable table (152), the revenue model weights table (159). the expense model weights (161), the capital model weights (163), the composite variable data table (168), the revenue driver table (179), the expense driver table (180) and the capital driver table (181) as required to define and initialize a probabilistic simulation model. The preferred embodiment of the probabilistic simulation model is a Markov Chain Monte Carlo model, however, other simulation models can be used with similar results. The information defining the model is then stored in the scenario table (184) before processing advances to a software block 854.

The operation of the software in block 854 is dependent upon the input stored in the scenario table (184). If the user has specified changes in value drivers and is seeking to understand the probable impact of these changes on the other value drivers, the financial performance and the future value of the enterprise, then the software in block 854 iterates the model as required to ensure the convergence of the frequency distribution of the output variables. Alternatively, if the user specified a specific level of future financial performance and is seeking a recommendation regarding changes to be made, then the simulation is run in a goal seeking mode. In either case after the simulation calculations have been completed, the software in block 854 saves the resulting information in the scenario table (184) before processing advances to a software block 855.

The software in block 855 displays the results of the simulation to the user (20) via a Value Mentor™ display data window (920) that uses a summary Value Map™ format to display the mid point and the range of estimated future values for the various elements of the enterprise and the changes in value drivers, user-specified or system generated, that drove the future value estimate. The user (20) is also prompted to indicate when the examination of the displayed report is complete. When the user (20) indicates that the examination is complete, processing advances to a software block 856. The software in block 856 prompts the user via a Value Mentor™ report data window (922) to indicated if any additional reports should be printed. The information entered by the user (20) is entered in to the reports table (172) before processing advances to a block 857.

The software in block 857 checks the reports tables (172) to determine if any additional reports have been designated for printing. If additional reports have been designated for printing, then processing advances to a block 858 which prepares and sends the designated reports to the printer (118). After the reports have been sent to the printer (118), processing advances to software block 812 where processing stops. If the software in block 857 determines that no additional reports have been designated for printing, then processing advances to block 812 where processing stops.

Thus, the reader will see that the system and method described above transforms extracted transaction data and information into detailed valuations for specific elements of a business enterprise. The level of detail contained in the business valuations enables the analysis and simulation of the impact of changes in the identified business value drivers on the other value drivers, the financial performance and the future value of the enterprise.

While the above description contains many specificity's, these should not be construed as limitations on the scope of the invention, but rather as an exemplification of one preferred embodiment thereof. Accordingly, the scope of the invention should be determined not by the embodiment illustrated, but by the appended claims and their legal equivalents.

What is claimed is:

1. A data processing system for valuing contributions by one or more tangible or intangible elements of value to a value of a business enterprise, comprising:
   (a) processing means for processing data;
   (b) storage means for storing data;
   (c) first means for obtaining data related to the value of the business enterprise, the business enterprise having one or more tangible or intangible elements of value contributing to the value of the business enterprise;
   (d) second means for calculating, for each one of the tangible or intangible elements of value, value drivers that drive the value of the business enterprise, the value drivers to define a composite variable characterizing a performance of the tangible or intangible element of value of the business enterprise wherein transaction data, transaction ratios and transaction trends are combined to calculate the composite variable;
   (e) third means for calculating the value of the business enterprise;
   (f) fourth means for determining, for each one of the tangible or intangible elements of value, a percentage of the value of the business enterprise contributed by the tangible or intangible element of value;
   (g) fifth means for calculating a value for each one of the tangible or intangible elements of value of the business enterprise based on the value of the business enterprise and the percentage of the value of the business enterprise contributed by the tangible or intangible element of value; and
   (i) sixth means for user modification of, for each one of the tangible or intangible elements of value, selected one or ones of the value drivers that drive the value of the business enterprise.

2. A data processing system as claimed in claim 1, wherein said sixth means comprises:
   (a) means for user modification of, for each one of the tangible or intangible elements of value, selected one or ones of the composite variable characterizing the performance of the tangible or intangible element of value of the business enterprise.

3. A data processing system as claimed in claim 1, wherein said sixth means comprises:
   (a) means for user modification of the value of each one of the tangible or intangible elements of value of the business enterprise.

4. A data processing system as claimed in claim 1, wherein the value of the business enterprises includes a revenue component, an expense component and a capital component.

5. A data processing system as claimed in claim 4, wherein said third means comprises:
   (a) means for calculating the revenue, expense and capital components of the value of the business enterprise.

6. A data processing system as claimed in claim 4, wherein said fourth means comprises:
   (a) means for determining, for each one of the tangible or intangible elements of value, a percentage of the revenue component contributed by the tangible or intangible element of value, a percentage of the expense component contributed by the tangible or intangible element of value, and a percentage of the capital component contributed by the tangible or intangible element of value.

7. A data processing system as claimed in claim 6, wherein said fifth means comprises:
   (a) means for calculating the value for each one of the tangible or intangible elements of value of the business enterprise based on the revenue, expense and capital components of the value of the business enterprise and the percentages of the revenue, expense and capital contributed by the tangible or intangible element of value.

8. A data processing system as claimed in claim 4, further comprising:
   (i) means for sub-dividing the revenue, expense and capital components of the value of the business enterprise into sub-components to yield a more detailed analysis.

9. A data processing system as claimed in claim 4, wherein said third means further comprises:
   (a) means for using output from a predictive model to determine the percentage of the revenue component contributed by the tangible or intangible element of value, the percentage of the expense component contributed by the tangible or intangible element of value, and the percentage of the capital component contributed by the tangible or intangible element of value.

10. A data processing system as claimed in claim 4, wherein said third means further comprises:
   (a) means for using output from a neural network to determine the percentage of the revenue component contributed by the tangible or intangible element of value, the percentage of the expense component contributed by the tangible or intangible element of value, and the percentage of the capital component contributed by the tangible or intangible element of value.

11. A data processing system as claimed in claim 1, further comprising:
   (i) means for direct valuing at least one of the tangible or intangible elements of value of the business enterprise.

12. A data processing system for valuing contributions by one or more tangible or intangible elements of value to a value of a business enterprise, comprising:

(a) processing means for processing data;

(b) storage means for storing data;

(c) first means for obtaining data related to the value of the business enterprise, the business enterprise having one or more tangible or intangible elements of value contributing to the value of the business enterprise;

(d) second means of calculating, for each one of the tangible or intangible elements of value, value drivers that drive the value of the business enterprise; the value drivers to define a composite variable characterizing a performance of the tangible or intangible element of value of the business enterprise wherein transaction data, transaction ratios and transaction trends are combined to calculate the composite variable;

(e) third means for calculating the value of the business enterprise;

(f) fourth means for determining, for each one of the tangible or intangible elements of value, a percentage of the value of the business enterprise contributed by the tangible or intangible element of value;

(g) fifth means for calculating a value for each one of the tangible or intangible elements of value of the business enterprise base don the value of the business enterprise and the percentage of the value of the business enterprise contributed by the tangible or intangible element of value;

(h) sixth means for user entry of a goal value related to the business enterprise; and (i) seventh means for calculating, for each one of the tangible or intangible elements of value, value drivers to realize said goal value based on associated composite variables characterizing the performance of the tangible or intangible elements of value of the business enterprise.

13. A data processing system as claimed in claim 12, wherein the value of the business enterprises includes a revenue component, an expense component and a capital component.

14. A data processing system as claimed in claim 13, wherein said third means comprises:

(a) means for calculating the revenue, expense and capital components of the value of the business enterprise.

15. A data processing system as claimed in claim 13, wherein said fourth means comprises:

(a) means for determining, for each one of the tangible or intangible elements of value, a percentage of the revenue component contributed by the tangible or intangible element of value, a percentage of the expense component contributed by the tangible or intangible element of value, and a percentage of the capital component contributed by the tangible or intangible element of value.

16. A data processing system as claimed in claim 15, wherein said fifth means comprises:

(a) means for calculating the value for each one of the tangible or intangible elements of value of the business enterprise based on the revenue, expense and capital components of the value of the business enterprise and the percentages of the revenue, expense and capital contributed by the tangible or intangible element of value.

17. A data processing system as claimed in claim 13, further comprising:

(j) means for sub-dividing the revenue, expense and capital components of the value of the business enterprise into sub-components to yield a more detailed analysis.

18. A data processing system as claimed in claim 13, wherein said third means further comprises:

(a) means for using output from a predictive model to determine the percentage of the revenue component contributed by the tangible or intangible element of value, the percentage of the expense component contributed by the tangible or intangible element of value, and the percentage of the capital component contributed by the tangible or intangible element of value.

19. A data processing system as claimed in claim 13, wherein said third means further comprises:

(a) means for using output from a neural network to determine the percentage of the revenue component contributed by the tangible or intangible element of value, the percentage of the expense component contributed by the tangible or intangible element of value, and the percentage of the capital component contributed by the tangible or intangible element of value.

20. A data processing system as claimed in claim 12, further comprising:

(j) means for direct valuing at least one of the tangible or intangible elements of value of the business enterprise.

* * * * *